US012750789B2

(12) United States Patent
Huang et al.

(10) Patent No.: US 12,750,789 B2
(45) Date of Patent: Sep. 29, 2026

(54) FULL POWER EIGHT-PORT UPLINK TRANSMISSION MODE

(71) Applicant: QUALCOMM Incorporated, San Diego, CA (US)

(72) Inventors: Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 18/469,358

(22) Filed: Sep. 18, 2023

(65) Prior Publication Data

US 2024/0114468 A1 Apr. 4, 2024

Related U.S. Application Data

(60) Provisional application No. 63/378,024, filed on Sep. 30, 2022.

(51) Int. Cl.
*H04W 52/36* (2009.01)
*H04W 52/14* (2009.01)

(52) U.S. Cl.
CPC ....... *H04W 52/367* (2013.01); *H04W 52/146* (2013.01)

(58) Field of Classification Search
CPC ............. H04W 52/367; H04W 52/146; H04W 52/346; H04W 52/42; H04W 52/52; H04B 7/0426; H04B 7/0456; H04B 7/0628
See application file for complete search history.

(56) References Cited

U.S. PATENT DOCUMENTS

2021/0051608 A1 2/2021 Sridharan et al.
2021/0352596 A1* 11/2021 Liu ...................... H04B 7/0456
2022/0287059 A1* 9/2022 Huang ................ H04W 52/146
2023/0037090 A1* 2/2023 Wang .................... H04W 52/58
(Continued)

FOREIGN PATENT DOCUMENTS

CN 111050390 A * 4/2020 ............ H04W 52/18
EP 3883303 A1 9/2021
(Continued)

OTHER PUBLICATIONS

International Search Report and Written Opinion—PCT/US2023/074567—ISA/EPO—Dec. 15, 2023.
(Continued)

*Primary Examiner* — Jae Y Lee
(74) *Attorney, Agent, or Firm* — QUALCOMM Incorporated

(57) ABSTRACT

Various aspects of the present disclosure generally relate to wireless communication. In some aspects, a user equipment (UE) may configure, based on a precoder and a total power scaling factor, a total transmission power of a physical uplink shared channel (PUSCH) communication, the total power scaling factor comprising a summation of a plurality of power scaling factors associated with a set of transmission ports of the UE, each transmission port of the set of transmission ports corresponding to a power amplifier (PA) of a set of PAs. The UE may transmit, to a network node, the PUSCH communication based on the total transmission power. Numerous other aspects are described.

30 Claims, 12 Drawing Sheets

(56) References Cited

U.S. PATENT DOCUMENTS

2024/0080071 A1* 3/2024 Tsai ..................... H04B 7/0482

FOREIGN PATENT DOCUMENTS

WO WO-2021085768 A1 * 5/2021 ............ H04W 52/54
WO WO-2023209682 A1 * 11/2023 .......... H04W 52/367

OTHER PUBLICATIONS

Samsung: "View on Full Power UL Transmission", 3GPP TSG RAN WG1 meeting #96, R1-1902307, UL Full Power TX, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, 8 Pages, XP051600001, Sections 1, 3, 4 and 5 table 5.

* cited by examiner

FULL POWER EIGHT-PORT UPLINK TRANSMISSION MODE

CROSS-REFERENCE TO RELATED APPLICATION

This patent application claims priority to U.S. Provisional Patent Application No. 63/378,024, filed on Sep. 30, 2022, entitled "FULL POWER EIGHT-PORT UPLINK TRANSMISSION MODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a full power eight-port uplink transmission mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmission power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include one or more memories and one or more processors coupled to the one or more memories. The one or more processors may be individually or collectively configured to cause the UE to configure, based on a precoder and a total power scaling factor, a total transmission power of a physical uplink shared channel (PUSCH) communication, the total power scaling factor comprising a summation of a plurality of power scaling factors associated with a set of transmission ports of the UE, each transmission port of the set of transmission ports corresponding to a power amplifier (PA) of a set of PAs. The memory may comprise instructions executable by the one or more processors to cause the UE to transmit, to a network node, the PUSCH communication based on the total transmission power.

Some aspects described herein relate to a network node for wireless communication. The network node may include one or more memories and one or more processors coupled to the one or more memories. The one or more processors may be individually or collectively configured to cause the network node to receive, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs. The memory may comprise instructions executable by the one or more processors to cause the network node to perform a wireless communication task based on receiving the PUSCH communication.

Some aspects described herein relate to a method of wireless communication performed by an apparatus at a UE. The method may include configuring, based on a precoder and a total power scaling factor, a total transmission power of a PUSCH communication, the total power scaling factor comprising a summation of a plurality of power scaling factors associated with a set of transmission ports of the UE, each transmission port of the set of transmission ports corresponding to a PA of a set of PAs. The method may include transmitting, to a network node, the PUSCH communication based on the total transmission power.

Some aspects described herein relate to a method of wireless communication performed by an apparatus at a network node. The method may include receiving, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs. The method may include performing a wireless communication task based on receiving the PUSCH communication.

Some aspects described herein relate to a non-transitory computer-readable medium that stores a set of instructions for wireless communication by a UE. The set of instructions, when executed by one or more processors of the UE, may cause the UE to configure, based on a precoder and a total power scaling factor, a total transmission power of a PUSCH communication, the total power scaling factor comprising a summation of a plurality of power scaling factors associated with a set of transmission ports of the UE, each transmission port of the set of transmission ports corresponding to a PA of a set of PAs. The set of instructions, when executed by one or more processors of the UE, may cause the UE to transmit, to a network node, the PUSCH communication based on the total transmission power.

Some aspects described herein relate to a non-transitory computer-readable medium that stores a set of instructions for wireless communication by a network node. The set of instructions, when executed by one or more processors of the network node, may cause the network node to receive, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs. The set of instructions, when executed by one or more processors of the network node, may cause the network node to perform a wireless communication task based on receiving the PUSCH communication.

Some aspects described herein relate to an apparatus for wireless communication. The apparatus may include means for configuring, based on a precoder and a total power scaling factor, a total transmission power of a PUSCH communication, the total power scaling factor comprising a summation of a plurality of power scaling factors associated with a set of transmission ports of the apparatus, each transmission port of the set of transmission ports corresponding to a PA of a set of PAs. The apparatus may include means for transmitting, to a network node, the PUSCH communication based on the total transmission power.

Some aspects described herein relate to an apparatus for wireless communication. The apparatus may include means for receiving, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs. The apparatus may include means for performing a wireless communication task based on receiving the PUSCH communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
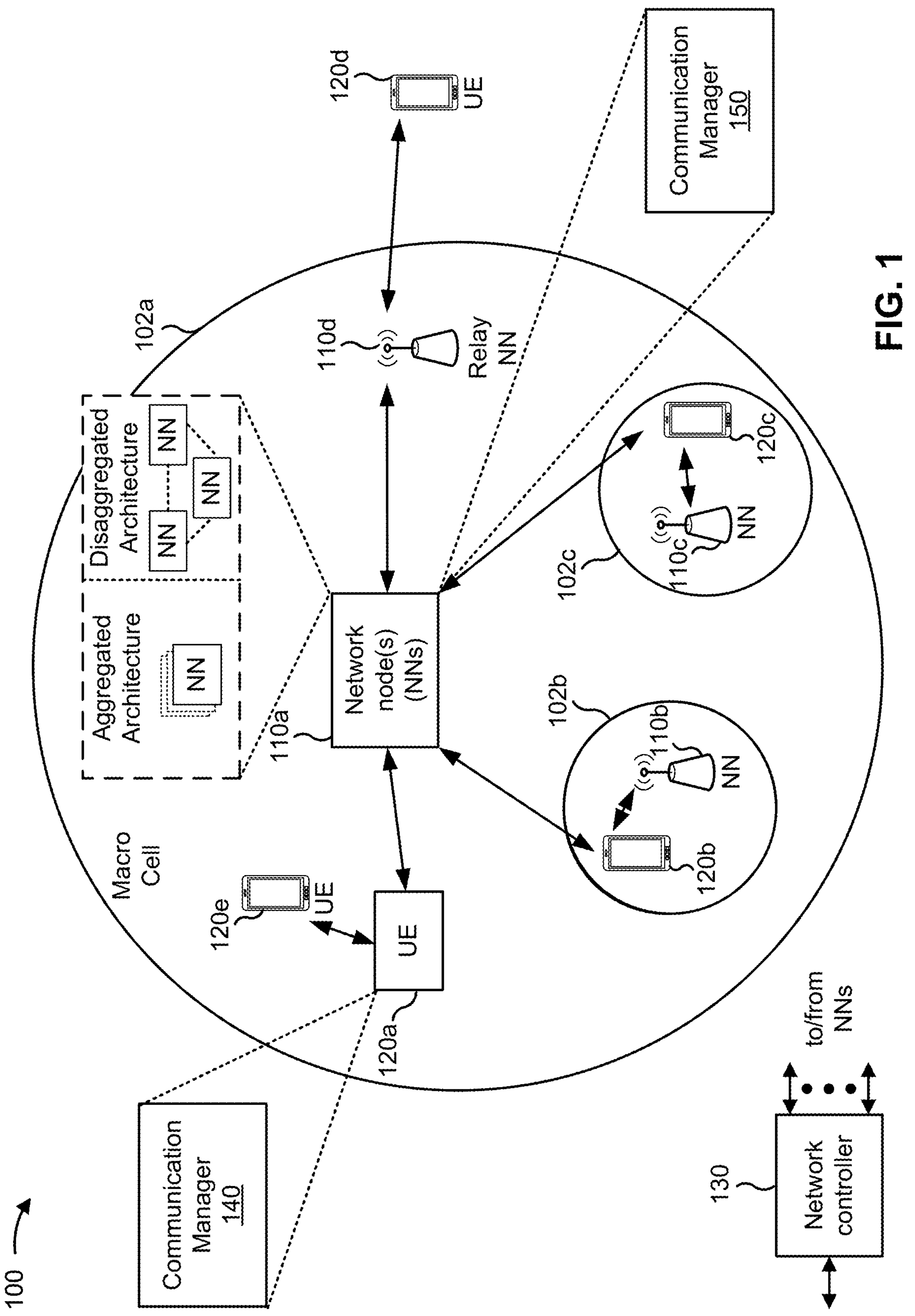
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmission power levels, different coverage areas, and/or different impacts on interference in the wireless network 100. For example, macro network nodes may have a high transmission power level (e.g., 5 to 40 watts) whereas pico network nodes, femto network nodes, and relay network nodes may have lower transmission power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may configure, based on a precoder and a total power scaling factor, a total transmission power of a physical uplink shared channel (PUSCH) communication, the total power scaling factor comprising a summation of a plurality of power scaling factors associated with a set of transmission ports of the UE, each transmission port of the set of transmission ports corresponding to a power amplifier (PA) of a set of PAs; and transmit, to a network node, the PUSCH communication based on the total transmission power. Additionally, or alternatively, the communication manager 140 may perform one or more other operations described herein.

In some aspects, the network node 110 may include a communication manager 150. As described in more detail elsewhere herein, the communication manager 150 may receive, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs; and perform a wireless communication task based on receiving the PUSCH communication. Additionally, or alternatively, the communication manager 150 may perform one or more other operations described herein.

As indicated above, FIG. 1 is provided as an example. Other examples may differ from what is described with regard to FIG. 1.

Figure 2:
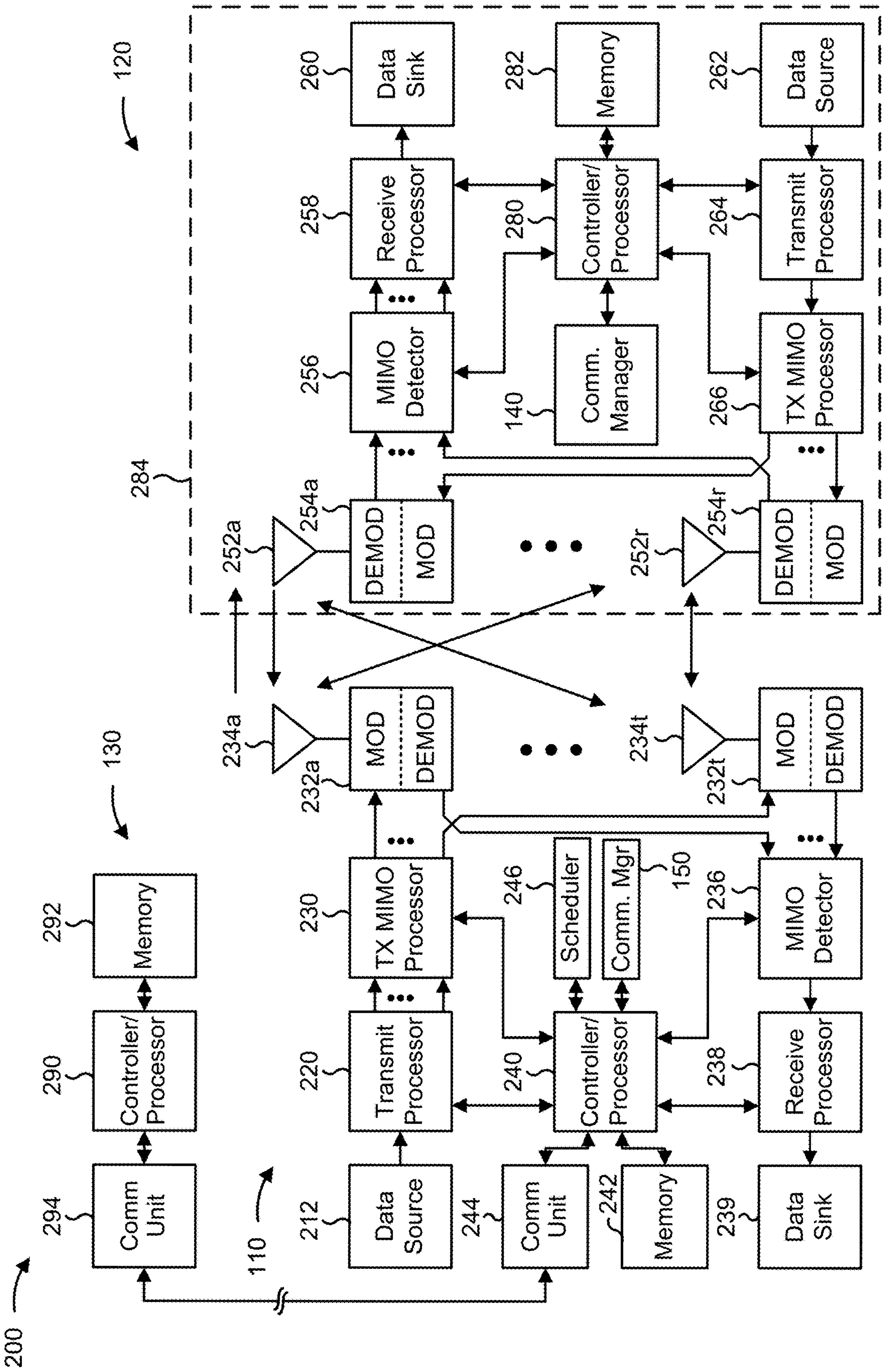
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH).

The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with a full power eight-power uplink transmission mode, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for configuring, based on a precoder and a total power scaling factor, a total transmission power of a PUSCH communication, the total power scaling factor comprising a summation of a plurality of power scaling factors associated with a set of transmission ports of the UE, each transmission port of the set of transmission ports corresponding to a PA of a set of PAs; and/or means for transmitting, to a network node, the PUSCH communication based on the total transmission power. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs; and/or means for performing a wireless communication task based on receiving the PUSCH communication. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
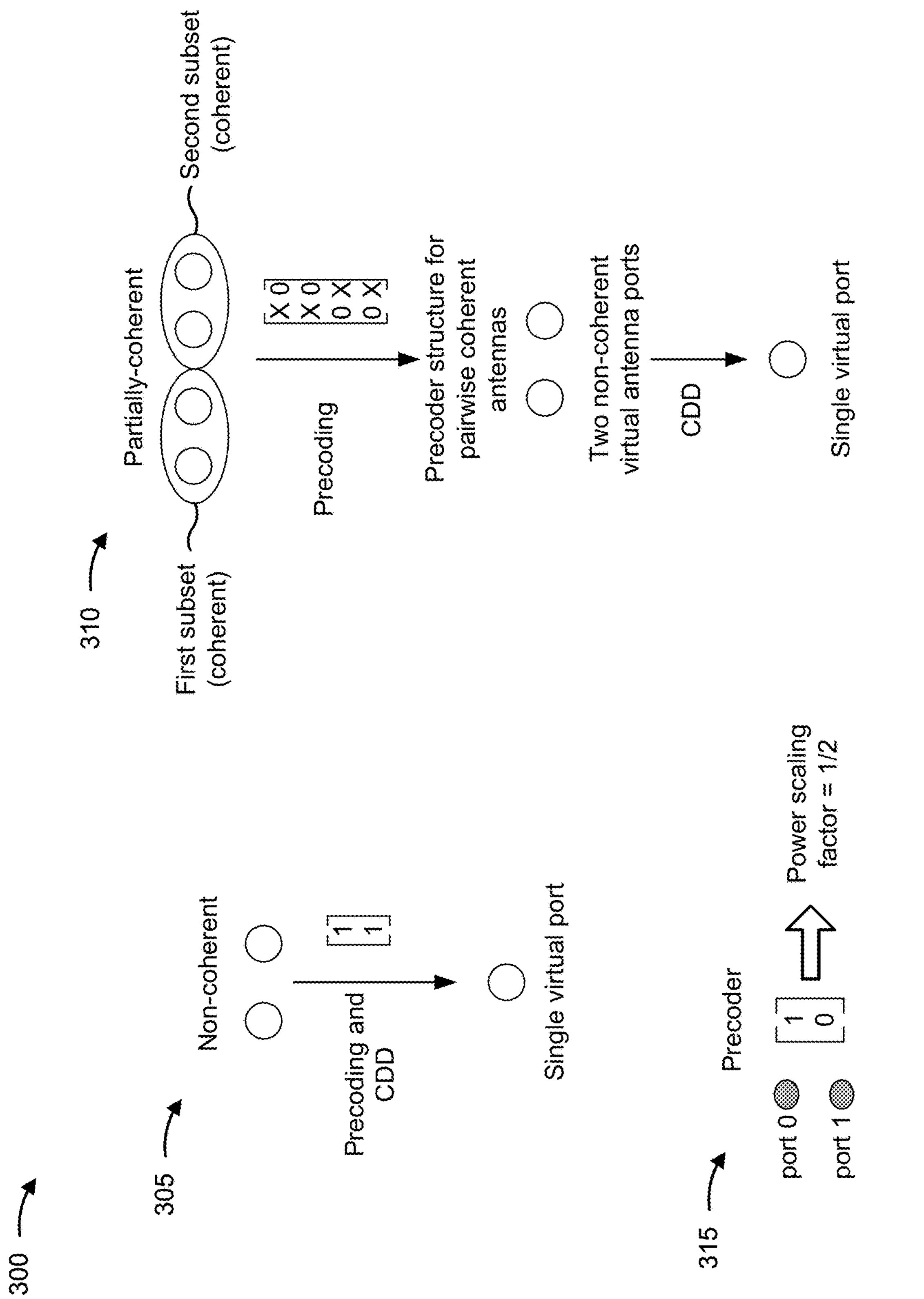
FIG. 3 is a diagram illustrating an example of forming a virtual port by combining non-coherent and/or partially-coherent antenna ports, in accordance with the present disclosure.

FIG. 3 is a diagram illustrating an example 300 of forming a virtual port by combining non-coherent and/or partially-coherent antenna ports, in accordance with the present disclosure.

A multi-antenna UE 120 and/or a set of antenna ports of the UE 120 may be classified into one of three groups depending on coherence of the antenna ports of the UE 120. A set of antenna ports (e.g., two antenna ports) are coherent if the relative phase among the set of antenna ports (e.g., between the two antenna ports) remains the same between the time of a sounding reference signal (SRS) transmission from those antenna ports and a subsequent physical uplink shared channel (PUSCH) transmission from those antenna ports. When this is the case, the SRS can be used (e.g., by the UE 120 and/or a network node 110) to determine an uplink precoder for precoding the PUSCH transmission, since the relative phase of the antenna ports will be the same for the SRS transmission and the PUSCH transmission. In this case, precoding can span across the set of coherent antenna ports (sometimes referred to herein as coherent ports). If a set of antenna ports is not coherent (i.e., non-coherent), then such an uplink precoder determination becomes difficult, because the relative phase of the antenna ports will change from the SRS transmission to the PUSCH transmission.

For example, a set of antenna ports is considered non-coherent if the relative phase among the set of antenna ports is different for the SRS transmission and the PUSCH transmission. In this case, precoding does not span across the set of non-coherent antenna ports (sometimes referred to as non-coherent ports). Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within the subsets of coherent ports, but not across the subsets of non-coherent ports. However, certain techniques can be applied to synthesize a virtual antenna port (sometimes referred to herein as a virtual port) from antenna ports that lack coherence (e.g., so that common precoding can be used on the virtual port and applied to the non-coherent antenna ports).

For example, as shown by reference number 305, a set of non-coherent antenna ports (e.g., shown as two non-coherent antenna ports) can be combined into a single virtual port using precoding (e.g., uplink precoding) and cyclic delay diversity. The precoder may be determined by the UE 120 and/or signaled by a network node 110. "Cyclic delay diversity" (CDD) may refer to a technique where a delay (e.g., a cyclic delay) is introduced on one of the non-coherent ports and not on the other non-coherent port. The delay may be measured in samples (e.g., 5 samples, 10 samples, and/or the like), fractions of samples, and/or the like. For example, a first non-coherent port may transmit a first stream of samples, and the second non-coherent port may transmit a second stream of samples (e.g., which may be the same stream) with a slight cyclic delay (e.g., a delay of 5 samples, 10 samples, and/or the like). For example, for a cyclic delay of 5 samples, where 16 samples are transmitted per symbol, the first non-coherent port may transmit the 16 samples with a first sample transmitted first (e.g., [s1, s2, s3, s4, . . . , s16]), and the second non-coherent port may transmit the 16 samples with the first sample transmitted sixth (e.g., with a delay of five samples) (e.g., [s12, s13, s14, s15, s16, s1, s2, s3, . . . , s11]).

Additionally, or alternatively, as shown by reference number 310, a set of partially-coherent antenna ports (sometimes referred to herein as partially-coherent ports) can be combined into a single virtual port using precoding (e.g., uplink precoding) and cyclic delay diversity, in a similar manner as described above. As shown, a first subset of ports may be coherent with one another, and a second subset of ports may be coherent with one another, but the two subsets may not be coherent with one another. As further shown, precoding may be applied to the individual subsets to generate a first virtual port and a second virtual port that are not coherent with one another. Then, CDD may be applied to these two virtual ports (e.g., by transmitting communications from the virtual ports using CDD), thereby forming a single virtual port from the partially-coherent ports (e.g., using precoding and CDD).

When a UE 120 is configured with multiple SRS ports for a multiple-input multiple-output (MIMO) mode, the UE 120 may be required to split a transmission power equally across all antenna ports used for a PUSCH transmission using a power scaling factor. The power scaling factor may be equal to the number of antenna ports with non-zero PUSCH transmission power divided by the maximum number of SRS ports supported by the UE 120 in one SRS resource. In this case, the UE 120 may not be able to transmit with maximum transmission power because the UE 120 is required to split the transmission power equally across all antenna ports on which the UE is configured to transmit a PUSCH communication. For example, as shown by reference number 315, when the UE 120 uses precoding to transmit on a single port (shown as port 0) of two configured ports (port 0 and port 1), the transmission power of the transmission on the single port (port 0) is scaled by a factor of ½ (one half).

In some cases, a network node 110 may need to instruct a UE 120 to transmit at maximum power, such as when the UE 120 is located near a cell edge or otherwise has poor link quality with the network node 110. However, different UEs 120 may have different capabilities regarding virtual port synthesis and which virtual ports of the UE 120 are capable of supporting a maximum transmission power. For example, the UE 120 may or may not be capable of synthesizing a virtual port that supports a maximum transmission power (e.g., of a power class of the UE 120) and/or may only be capable of supporting a maximum transmission power for a virtual port that is a combination of a specific set of actual antenna ports of the UE 120, depending on the hardware components of the UE 120, a number of transmission antennas of the UE 120, a number of transmission chains of the UE 120, a maximum transmission power supported by different power amplifiers and/or different combinations of power amplifiers of the UE 120, and/or the like.

In order for a network node 110 to instruct a UE 120 regarding a precoder (e.g., corresponding to a transmitted precoding matrix indicator (TPMI)) to be used to transmit at maximum power, the network node 110 needs to know which precoder(s) of the UE 120 are capable of supporting transmissions at the maximum power. However, the network node 110 may not have information regarding such capabilities of the UE 120, which may result in an instruction to transmit at maximum power using a precoder with which the UE 120 is not capable of transmitting at the maximum power. Some techniques and apparatuses described herein permit a UE 120 to signal capabilities regarding a total power scaling factor of the UE 120, precoders (e.g., TPMIs) that support a maximum transmission power for the UE 120, and/or the like. In this way, the network node 110 may configure and/or instruct the UE 120 to transmit at maximum transmission power using power scaling factors and/or precoders that supports the maximum transmission power.

Although FIG. 3 shows pairs of antenna ports in sets and subsets, in some aspects, a different number of antenna ports may be included in a set or a subset. For example, a set of antenna ports or subset of antenna ports may include three antenna ports, four antenna ports, and/or the like.

As indicated above, FIG. 3 is provided as an example. Other examples may differ from what is described with regard to FIG. 3.

Figure 4:
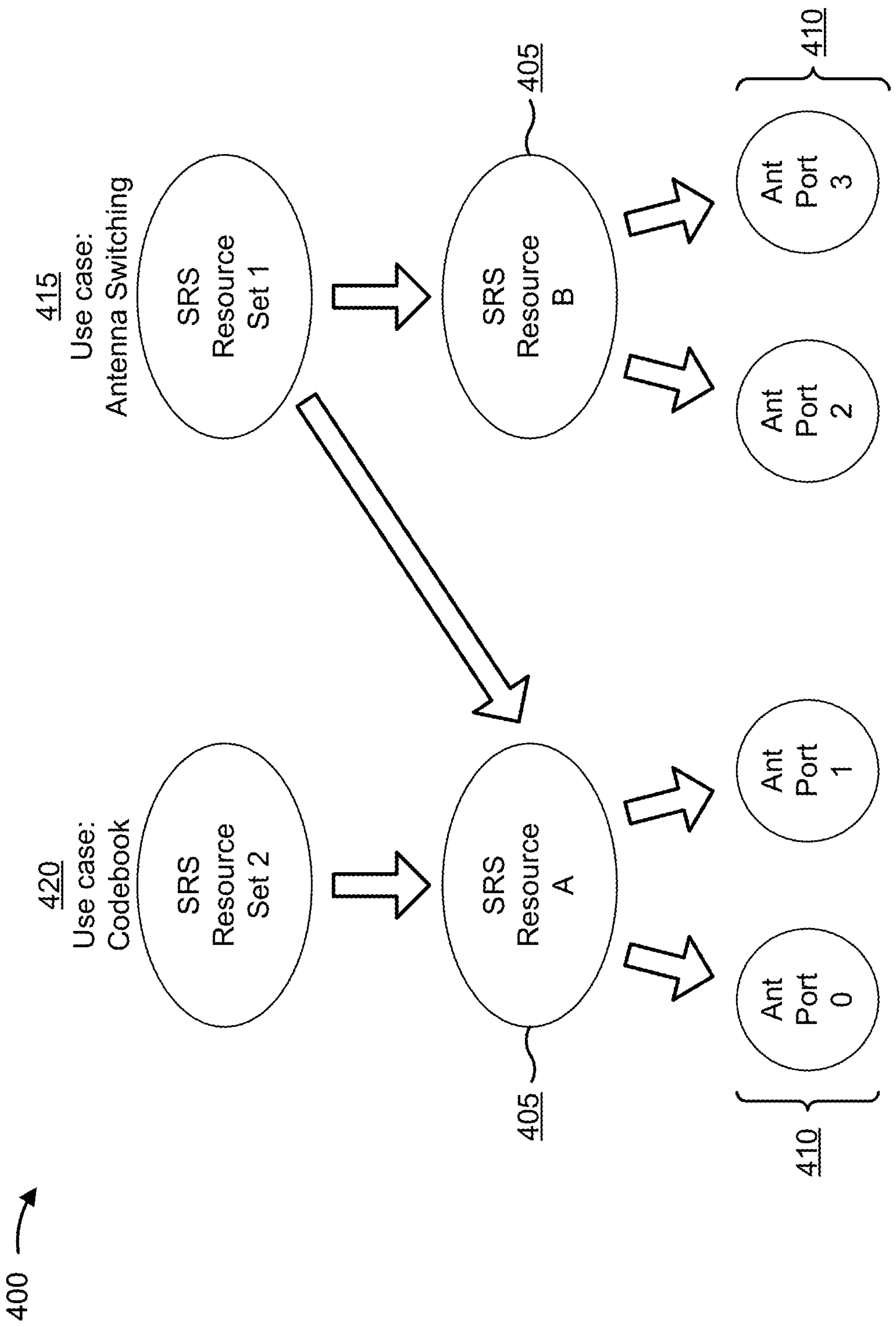
FIG. 4 is a diagram illustrating an example of sounding reference signal (SRS) resource sets, in accordance with the present disclosure.

FIG. 4 is a diagram illustrating an example 400 of sounding reference signal (SRS) resource sets, in accordance with various aspects of the present disclosure.

A network node 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message, an RRC reconfiguration message, and/or the like). As shown by reference number 405, an SRS resource set may include one or more resources (e.g., shown as SRS resources), which may include time resources and/or frequency resources (e.g., a slot, a symbol, a resource block, a periodicity for the time resources, and/or the like).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted, and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, beam management, and/or the like.

An antenna switching SRS resource set may be used to indicate downlink channel state information (CSI) with reciprocity between an uplink and downlink channel. For example, when there is reciprocity between an uplink channel and a downlink channel, a network node 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a network node 110 indicates an uplink precoder to the UE 120. For example, when the network node 110 is configured to indicate an uplink precoder to the UE 120 (e.g., using a precoder codebook), the network node 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the network node 110). In some aspects, virtual ports (e.g., a combination of two or more antenna ports) with a maximum transmission power may be supported at least for a codebook SRS.

A non-codebook SRS resource set may be used to indicate uplink CSI when the UE 120 selects an uplink precoder (e.g., instead of the network node 110 indicated an uplink precoder to be used by the UE 120. For example, when the UE 120 is configured to select an uplink precoder, the network node 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the network node 110).

A beam management SRS resource set may be used for indicating CSI for millimeter wave communications.

As shown in FIG. 4, in some aspects, different SRS resource sets indicated to the UE 120 (e.g., having different use cases) may overlap (e.g., in time, in frequency, and/or the like, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1, and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRS may be transmitted in SRS Resource A (e.g., the first time-frequency resource) using antenna port 0 and antenna port 1. In this case, the UE 120 may not transmit code book SRS in SRS Resource B (e.g., the second time-frequency resource) using antenna port 2 and antenna port 3.

As described above in connection with FIG. 3, when a UE 120 is configured with multiple SRS ports for a MIMO mode, the UE 120 may be required to split a transmission power equally across all antenna ports used for a PUSCH transmission using a power scaling factor. In this case, the UE 120 may not be able to transmit with maximum transmission power using a virtual port that is a combination of multiple non-coherent ports and/or multiple partially-coherent ports, because the UE 120 is required to split the transmission power equally across all antenna ports on which the UE transmits a PUSCH communication with non-zero transmission power. Some techniques and apparatuses described herein permit the UE 120 to transmit at a total transmission power comprising a summation of a plurality of power scaling factors associated with a plurality of PAs (e.g., configured by an SRS configuration).

As indicated above, FIG. 4 is provided as an example. Other examples may differ from what is described with regard to FIG. 4.

Figure 5A:
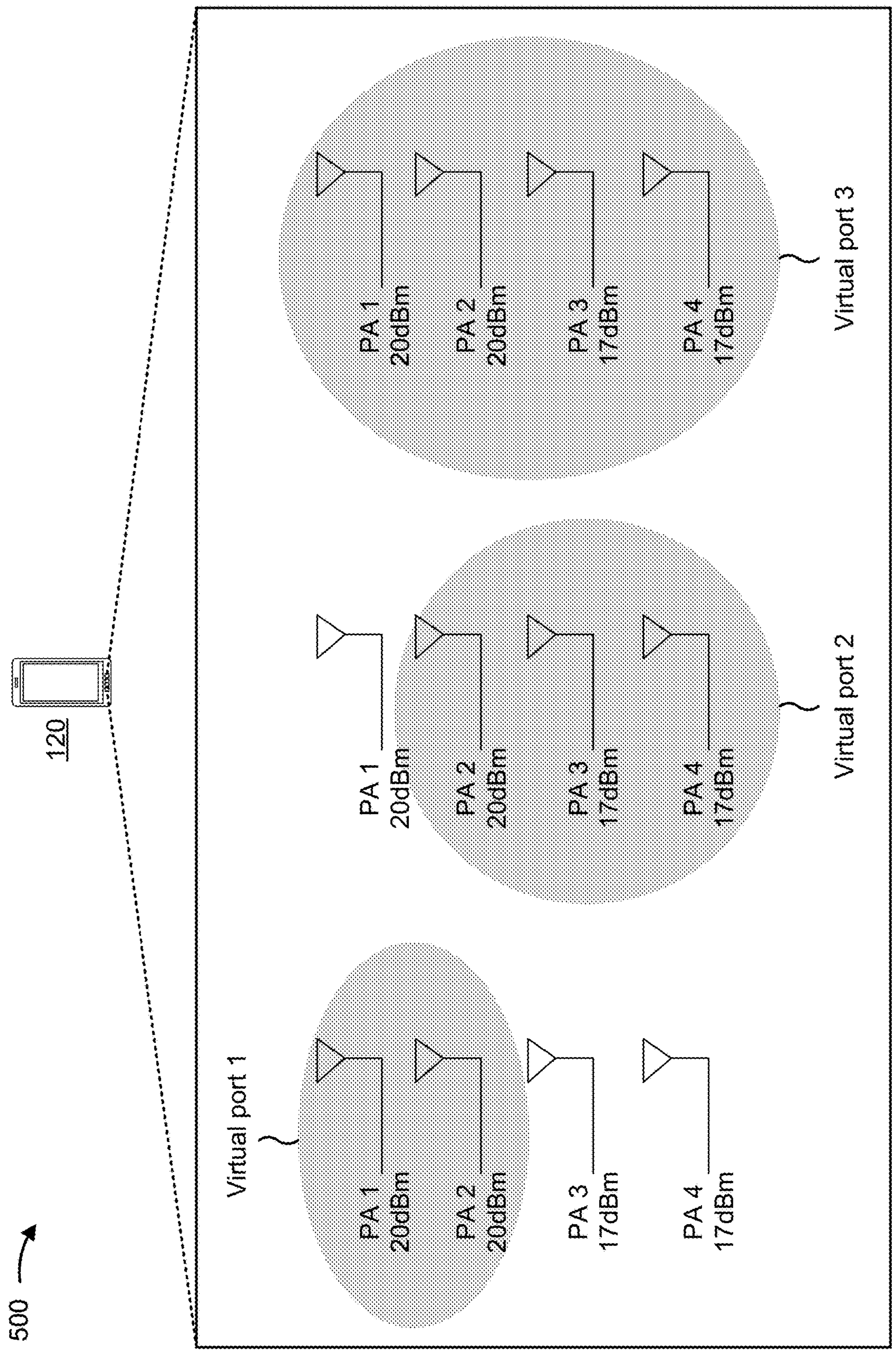
FIGS. 5A and 5B are diagrams illustrating examples of a UE hardware architecture that supports maximum transmission power using virtual ports, in accordance with the present disclosure.
Figure 5B:
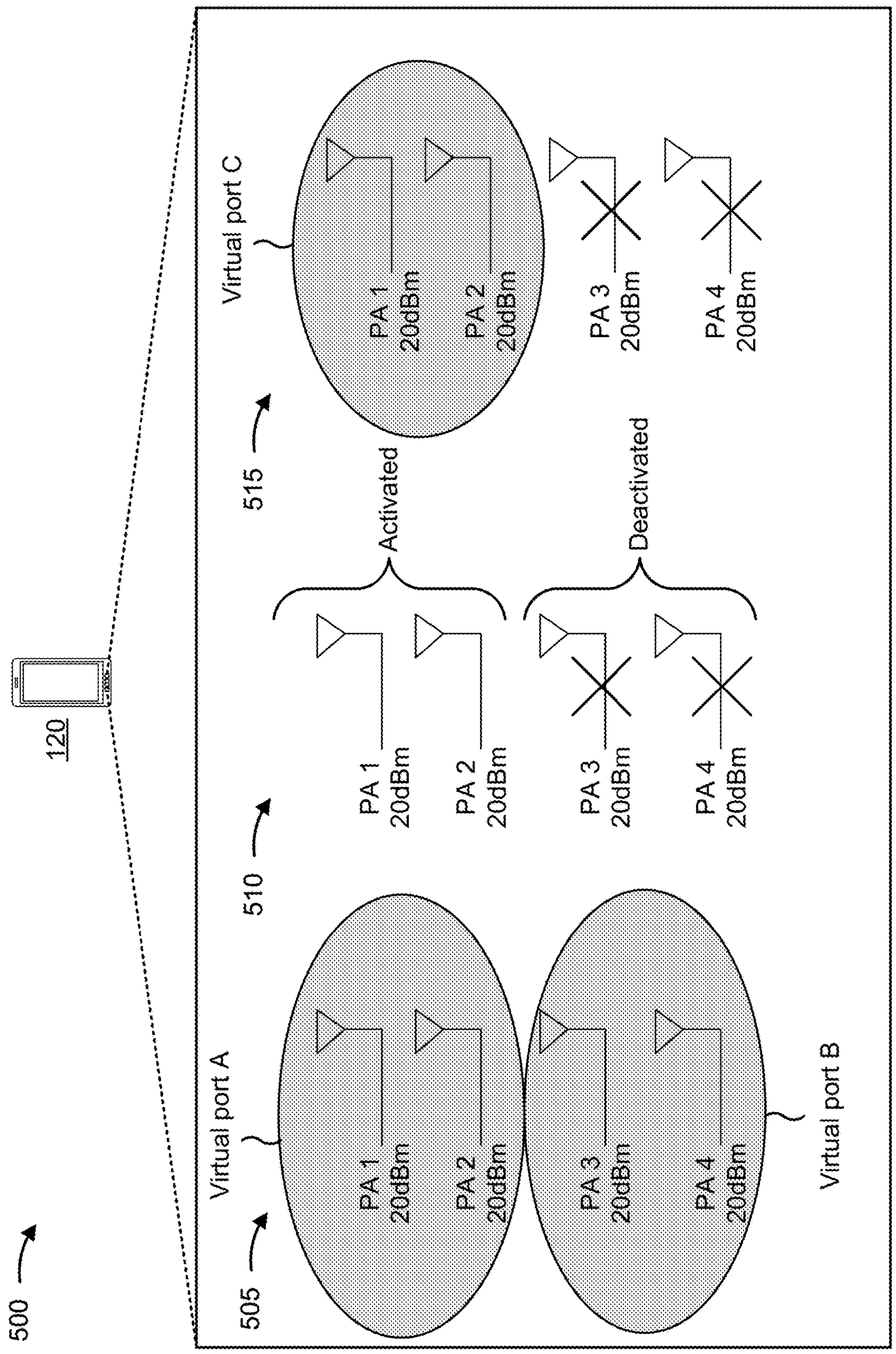

FIGS. 5A and 5B are diagrams illustrating examples 500 of a UE hardware architecture that supports maximum transmission power using virtual ports, in accordance with various aspects of the present disclosure.

As shown in FIG. 5A, a capability of a UE 120 to use virtual ports to support a maximum transmission power for a power class of the UE 120 may depend on a hardware architecture of the UE 120. Specifically, this capability of the UE 120 may depend on a number of transmission antennas (or transmission chains) of the UE 120, a number of power amplifiers of the UE 120, a transmission power capable of being supplied by each of those power amplifiers, and/or the like. As an example, the UE 120 of FIG. 5A is shown as having a first power amplifier (PA1) that supports a maximum power of 20 decibel-milliwatts (dBm), a second power amplifier (PA2) that supports a maximum power of 20 dBm, a third power amplifier (PA3) that supports a maximum power of 17 dBm, and a fourth power amplifier (PA4) that supports a maximum power of 17 dBm.

In some aspects, a UE 120 described herein may have a hardware architecture where a subset (e.g., fewer than all) of the power amplifiers of the UE 120 individually support a maximum transmission power of the UE 120 (e.g., without combining of antenna ports). For example, if the UE 120 is power class 3 with a maximum transmission power of 23 dBm, then fewer than all of the power amplifiers of the UE 120 may individually support 23 dBm transmissions. In example 500, none of the power amplifiers of the UE 120 individually (e.g., without combining of antenna ports) support a maximum transmission power of 23 dBm. However, in other examples, one of the four power amplifiers may individually support the maximum transmission power of 23 dBm, two of the four power amplifiers may individually support the maximum transmission power of 23 dBm, or three of the four power amplifiers may individually support the maximum transmission power of 23 dBm. For a UE 120 with two power amplifiers (and two corresponding antennas), none of the two power amplifiers may individually support the maximum transmission power of 23 dBm, or one of the two power amplifiers may individually support the maximum transmission power of 23 dBm.

Using this hardware architecture, for a UE 120 in power class 3 having a maximum transmission power of 23 dBm, that maximum transmission power can be achieved by synthesizing a virtual port using PA1 and PA2 (shown as virtual port 1), by synthesizing a virtual port using PA2, PA3, and PA4 (shown as virtual port 2), by synthesizing a virtual port using all four power amplifiers (shown as virtual port 3), and/or the like. However, this is only one example of a hardware architecture for a UE 120, and different UEs 120 may have different hardware architectures, such as a different number of transmission antennas (or transmission chains), a different number of power amplifiers, different transmission powers capable of being supplied by different power amplifiers, and/or the like. Thus, some UEs 120 may not be capable of synthesizing a virtual port that supports a maximum transmission power for a power class of the UE 120, different UEs 120 may be capable of synthesizing different numbers of virtual ports that support a maximum transmission power, and different UEs 120 may be capable of synthesizing virtual ports that support a maximum transmission power using different precoders (e.g., different combinations of antennas and/or power amplifiers).

As indicated above in connection with FIG. 3, in order for a network node 110 to instruct a UE 120 regarding a precoder (e.g., a TPMI) to be used to transmit at maximum power, the network node 110 needs to know which precoder(s) of the UE 120 are capable of supporting transmissions at the maximum power. However, the network node 110 may not have information regarding such capabilities of the UE 120, which may result in an instruction to transmit at maximum power using a precoder with which the UE 120 is not capable of transmitting at the maximum power. Some techniques and apparatuses described herein permit a UE 120 to signal capabilities regarding virtual ports of the UE 120 that support a maximum transmission power, precoders (e.g., TPMIs) that support a maximum transmission power for the UE 120, and/or the like. In this way, the network node 110 may configure and/or instruct the UE 120 to transmit at maximum transmission power using a virtual port and/or precoder that supports the maximum transmission power.

As shown in FIG. 5B, a 4 Tx UE 120 may have four power amplifiers (and a corresponding four transmission antennas and four transmission chains), but may behave like a 2 Tx UE 120 (e.g., a UE 120 having two power amplifiers and a corresponding two transmission antennas and two transmission chains). For example, as shown by reference number 505, a 4 Tx UE 120 may synthesize a first virtual port using PA1 and PA2 (shown as virtual port A), and may synthesize a second virtual port using PA3 and PA 4 (shown as virtual port B). In this case, the 4 Tx UE 120 may transmit using the two virtual ports, and thus may behave like a 2 Tx UE.

As another example, and as shown by reference number 510, a 4 Tx UE 120 may deactivate or disable two power amplifiers, two transmission chains, and/or two transmission antennas (e.g., for power saving). In this case, the 4 Tx UE 120 may transmit using the two activated power amplifiers, transmission chains, and/or transmission antennas, and thus may behave like a 2 Tx UE. As shown by reference number 515, in some aspects, the 4 Tx UE 120 may be capable of synthesizing a virtual port (shown as virtual port C) using the two activated power amplifiers, transmission chains, and/or transmission antennas.

As indicated above, FIGS. 5A and 5B are provided as examples. Other examples may differ from what is described with regard to FIGS. 5A and 5B.

Figure 6:
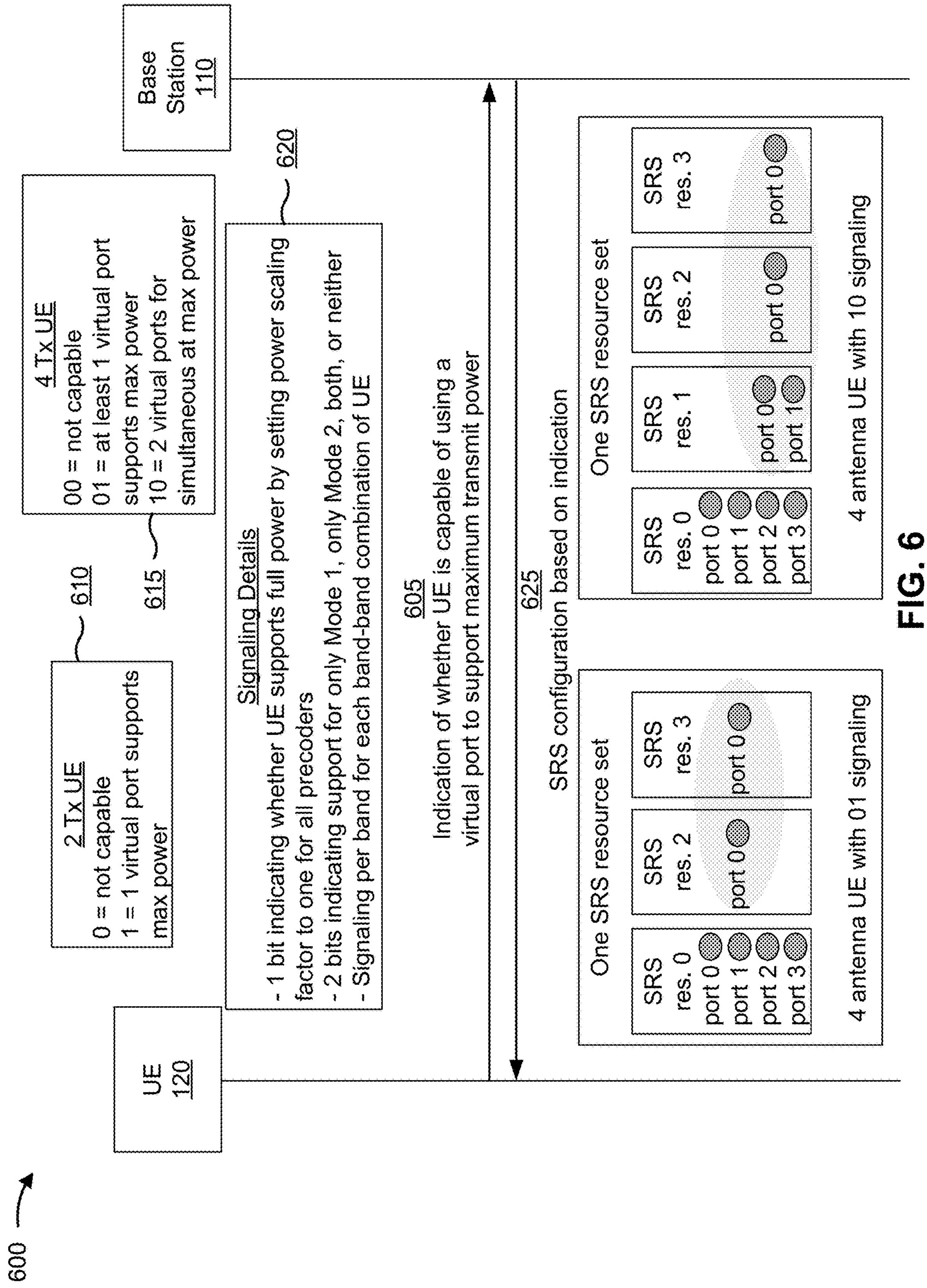
FIG. 6 is a diagram illustrating an example of signaling and configuration of maximum transmission power using virtual ports, in accordance with the present disclosure.

FIG. 6 is a diagram illustrating an example 600 of signaling and configuration of maximum transmission power using virtual ports, in accordance with various aspects of the present disclosure. As shown in FIG. 6, a UE 120 and a network node 110 may communicate with one another.

As shown by reference number 605, the UE 120 may transmit, to the network node 110, an indication of whether the UE 120 is capable of using a virtual port to transmit uplink communications using a maximum transmission power. The maximum transmission power may be defined by a power class of the UE 120. For example, the maximum transmission power may be 23 dBm for a UE 120 of power class 3. As described elsewhere herein, a virtual port may be a combination of two or more non-coherent or partially-coherent antenna ports of the UE 120. For example, the two or more non-coherent or partially-coherent antenna ports may be combined using precoding and/or cyclic delay diversity to synthesize the virtual port. Additionally, or alternatively, a virtual port may be a combination of one or more antenna ports. For example, a virtual port may be a combination of multiple (e.g., two or more antenna ports) or a single actual antenna port powered by a power amplifier capable of transmitting at the maximum transmission power without being combined with another antenna port. In some aspects, a UE 120 that is capable of using a virtual port to transmit uplink communications using a maximum transmission power may be referred to as a Mode 2 UE, while "Mode 1 UE" may refer to a UE 120 that is not capable of synthesizing a virtual port, but that is capable of supporting the maximum transmission power by using non-coherent ports and/or partially-coherent ports to use fully-coherent precoders using cyclic delay diversity. In some aspects, a Mode 1 UE may support the maximum transmission power using precoders that span across non-coherent antenna ports. For example, a Mode 1 UE may support the maximum transmission power using precoding and cyclic delay diversity. In a Mode 0, a power scaling factor is removed or set to 1. In this way, any single Tx chain and/or PA can deliver full power. In some cases, Mode 0 can be a default mode.

Additionally, or alternatively, the UE 120 may transmit, to the network node 110, an indication of a number of virtual ports that the UE 120 is capable of using to transmit uplink communications using the maximum transmission power. For example, the UE 120 may indicate that the UE 120 is capable of synthesizing only one (e.g., a single) virtual port that supports the maximum transmission power. As another example, the UE 120 may indicate that the UE 120 is capable of synthesizing multiple virtual ports that support the maximum transmission power. In some aspects, the UE 120 may use a single message, a single set of bits, and/or a single field of a message to indicate whether the UE 120 is capable of using a virtual port to transmit uplink communications using a maximum transmission power and to indicate a number of virtual ports that the UE 120 is capable of using to transmit uplink communications using the maximum transmission power.

As shown by reference number 610, as an example for a UE 120 with two transmission antennas (and/or two transmission chains), the UE 120 may transmit a one bit indication (e.g., a single bit). A first value of the bit (e.g., 0) may indicate that the UE 120 is not capable of using a virtual port to transmit uplink communications using the maximum transmission power. A second value of the bit (e.g., 1) may indicate that the UE 120 is capable of using a single virtual port to transmit uplink communications using the maximum transmission power.

In some aspects, a UE 120 with four transmission antennas (and/or four transmission chains or power amplifiers), referred to as a 4 Tx UE, may use a one bit indication when the 4 Tx UE behaves like a 2 Tx UE (e.g., as described above in connection with FIG. 5B). In this case, a first value of the bit (e.g., 0) may indicate that the 4 Tx UE is not capable of using a virtual port to transmit uplink communications using the maximum transmission power. A second value of the bit (e.g., 1) may indicate that the 4 Tx UE is capable of using at least one virtual port to transmit uplink communications using the maximum transmission power. For example, if the 4 Tx UE behaves like a 2 Tx UE due to synthesizing two virtual ports (e.g., virtual port A and virtual port B of FIG. 5B), then the second value of the bit may indicate that the 4 Tx UE is capable of using either a single one of the two virtual ports or both of the virtual ports to transmit uplink communications using the maximum transmission power. As another example, if the 4 Tx UE behaves like a 2 Tx UE due to deactivating two power amplifiers, then the second value of the bit may indicate that the 4 Tx UE is capable of using a single virtual port (e.g., virtual port C of FIG. 5B), synthesized from the two activated power amplifiers), to transmit uplink communications using the maximum transmission power In some aspects, a 4 Tx UE may use a multi-bit indication (e.g., two bits), with a first value of the bit indicating that the 4 Tx UE is not capable of using a virtual port to transmit uplink communications using the maximum transmission power, a second value of the bit indicating that the 4 Tx UE is capable of using only a first virtual port (e.g., virtual port A or virtual port C of FIG. 5B) to transmit uplink communications using the maximum transmission power, a third value of the bit indicating that the 4 Tx UE is capable of using only a second virtual port (e.g., virtual port B of FIG. 5B) to transmit uplink communications using the maximum transmission power, and a fourth value of the bit indicating that the 4 Tx UE is capable of using both the first virtual port and the second virtual port (separately) to transmit uplink communications using the maximum transmission power.

In some aspects, an N Tx UE (e.g., a 4 Tx UE) may indicate, in a UE capability report, that the N Tx UE behaves like a K Tx UE (e.g., a 2 Tx UE), where K<N. Additionally, or alternatively, an N Tx UE may indicate, in a UE capability report, whether the N Tx UE behaves like a K Tx UE due to synthesis of multiple virtual ports, whether the N Tx UE behaves like a K Tx UE due to deactivation of a subset of power amplifiers of the N Tx UE, and/or the like.

As shown by reference number 615, as an example for a UE 120 with four transmission antennas (and/or four transmission chains), the UE 120 may transmit a two bit indication. A first value of the indication (e.g., 00) may indicate that the UE 120 is not capable of using a virtual port to transmit uplink communications using the maximum transmission power. A second value of the indication (e.g., 01) may indicate that the UE 120 is capable of using at least one virtual port (e.g., one or more virtual ports) to transmit uplink communications using the maximum transmission power, such as when the UE 120 is a power class 3 UE with four power amplifiers that are each capable of a maximum of 17 dBm transmission (e.g., where all four 17 dBm power amplifiers are combined to generate 23 dBm of power). A third value of the indication (e.g., 10) may indicate that the UE 120 is capable of using two virtual ports to transmit simultaneous uplink communications (e.g., using different MIMO layers) using the maximum transmission power on each of the two virtual ports, such as when the UE 120 is a power class 3 UE with four power amplifiers that are each capable of a maximum of 20 dBm transmission (e.g., where a first 20 dBm power amplifier and a second 20 dBm power amplifier are combined to generate 23 dBm of power, and a third 20 dBm power amplifier and a fourth 20 dBm power amplifier are combined to generate 23 dBm of power). In some aspects, a value of the indication may indicate an exact number of virtual ports that the UE 120 is capable of using to transmit uplink communications using the maximum transmission power (e.g., one virtual port, two virtual ports, three virtual ports, and so on), such as by using a value of 11.

In some aspects, a 4 Tx UE behaving like a 2 Tx UE due to synthesis of two virtual ports may indicate a capability to transmit using the maximum transmission power for each of the two virtual ports. For example, the 4 Tx UE may indicate that none of the two virtual ports supports the maximum transmission power, that only one of the two virtual ports supports the maximum transmission power, that only a first virtual port of the two virtual ports supports the maximum transmission power, that only a second virtual port of the two virtual ports supports the maximum transmission power, that both of the two virtual ports (separately or independently) support the maximum transmission power, and/or the like. Additionally, or alternatively, a 4 Tx UE behaving like a 2 Tx due to synthesis of two virtual ports may indicate whether the two virtual ports are coherent with one another or non-coherent with one another (e.g., using a single bit indication). Additionally, or alternatively, a 4 Tx UE behaving like a 2 Tx UE may indicate a number of activated power amplifiers (or transmission chains or transmission antennas), a number of deactivated power amplifiers (or transmission chains or transmission antennas), a number of virtual ports that the 4 Tx UE is capable of synthesizing, a number of virtual ports that the 4 Tx UE is capable of using to transmission using the maximum transmission power, one or more virtual port identifiers that indicate which of the virtual ports the 4 Tx UE is capable of using to transmit using the maximum transmission power, whether a pair or set of virtual ports are coherent (or non-coherent) with one another, and/or the like. These examples also apply generally to an N Tx UE behaving like a K Tx UE, where K is less than N.

As shown by reference number 620, as another example of UE signaling, the UE 120 may transmit a single bit to indicate whether the UE 120 supports full power (e.g., the maximum transmission power for the power class of the UE 120) by setting a power scaling factor in power control to one for all precoders. This may indicate, for example, whether all transmission chains of the UE 120 include a respective power amplifier that supports the maximum transmission power. In some aspects, a UE 120 that has a fully-rated power amplifier (e.g., a power amplifier that supports a maximum transmission power) included in each transmission chain of the UE 120 may be referred to as a capability 1 UE. If the UE 120 is a capability 1 UE, then the UE 120 need not signal any additional information regarding full power capability of the UE 120. For example, if the UE 120 is a capability 1 UE, then the UE 120 need not signal any information in the two bits described below for indicating support for mode 1 or mode 2, need not signal any information regarding TPMIs that support the maximum transmission power (e.g., as described below in connection with FIGS. 7-10), and/or the like.

As further shown, the UE 120 may transmit two bits that indicate whether the UE 120 supports only Mode 1 and not Mode 2, only Mode 2 and not Mode 1, both Mode 1 and Mode 2, or neither Mode 1 nor Mode 2. Details regarding Mode 1 and Mode 2 are described above. For example, "Mode 1 capability" may refer to a capability to support the maximum transmission power using precoders that span across non-coherent antenna ports. As another example, "Mode 2 capability" may refer to a capability to support the maximum transmission power using a virtual port. In some aspects, the UE 120 may use these two bits if the UE 120 does not have any transmission chains with a fully-rated power amplifier (sometimes referred to as a capability 2 UE) and/or if fewer than all (e.g., a subset of) the transmission chains of the UE 120 have a fully-rated power amplifier (sometimes referred to as a capability 3 UE). Conversely, the UE 120 need not signal anything in these two bits if the UE 120 is a capability 1 UE, as described above. In some aspects, if the UE 120 supports Mode 2 (e.g., with or without support for Mode 1), then the UE 120 may transmit, to the network node 110, a bitmap that indicates a set of TPMIs that support a maximum transmission power for uplink communications, as described in more detail below in connection with FIGS. 7-10. If the UE 120 does not support Mode 2, then the UE 120 may refrain from transmitting the bitmap (e.g., because the UE 120 does not support virtual ports).

As further shown, the UE 120 may transmit the information described above (e.g., the single bit and/or the two bits) per band for a band-band combination (e.g., band in a band combination) supported by the UE 120 (e.g., per band for each band-band combination supported by the UE 120). For example, the UE 120 may have different capabilities for different bands in each bands-band combination. In some aspects, the UE 120 may transmit the information described above for every band in each band-band combination supported by the UE 120.

In some aspects, the UE 120 may transmit the indication in a field of a capability report (e.g., a UE capability report). In some aspects, the UE 120 may transmit the capability report with an empty or null value in this field, or with this field excluded, when each transmission chain of the UE 120 includes a power amplifier capable of supporting the maximum transmission power (e.g., and thus virtual ports are not necessary to achieve the maximum transmission power).

As shown by reference number 625, the network node 110 may transmit, to the UE 120, an SRS configuration based at least in part on the indication of whether the UE 120 is capable of using a virtual port to transmit uplink communications using a maximum transmission power. For example, the network node 110 may determine the SRS configuration based at least in part on the indication of whether the UE 120 is capable of using a virtual port to transmit uplink communications using a maximum transmission power, and may transmit the determined SRS configuration to the UE 120. Additionally, or alternatively, the network node 110 may determine the SRS configuration based at least in part on an indication, from the UE 120, of a number of virtual ports that the UE 120 is capable of using to transmit uplink communications using the maximum transmission power.

In some aspects, the network node 110 may determine a number of SRS resources to be configured for an SRS resource set for the UE 120 based at least in part on the indication. Additionally, or alternatively, the network node 110 may determine a type (e.g., a use case and/or the like) of SRS resources to be configured for an SRS resource set for the UE 120 based at least in part on the indication. The network node 110 may indicate the determined number and/or the determined type of SRS resources configured for an SRS resource set in the SRS configuration transmitted to the UE 120.

For example, a network node 110 may normally configure a number of ports, for an SRS resource, that is the same as the number of antenna ports of the UE 120 (e.g., at least for an SRS resource having a codebook use case). For example, for a UE 120 with four transmission antennas, the network node 110 assigns an SRS resource (e.g., a first SRS resource) that includes four antenna ports. However, if the UE 120 is capable of synthesizing one or more virtual ports, then the network node 110 may configure an additional SRS resource (e.g., a second SRS resource) for the one or more virtual ports, shown as SRS resource 2 and SRS resource 3 in FIG. 6. For example, if the UE 120 is capable of synthesizing a single virtual port, then the network node 110 may configure the UE 120 with an additional SRS resource with a single port (e.g., for the single virtual port). As another example, if the UE 120 is capable of synthesizing two virtual ports, then the network node 110 may configure the UE 120 with an additional SRS resource that includes either one port, shown by SRS resource 2 and SRS resource 3 in FIG. 6 (e.g., where the UE 120 selects one of the two virtual ports for sounding using the SRS resource, to conserve SRS overhead), or two ports, shown by SRS resource 1 in FIG. 6 (e.g., one for each virtual port, which allows the UE 120 to sound both virtual ports).

In some cases, a UE may be configured with eight transmission ports (e.g., eight transmission antennas (and/or eight transmission chains and/or power amplifiers), and may be referred to as an 8 Tx UE. In some cases, mode 1 and mode 2 can be used for 8 Tx PUSCH, for example. The UE can be configured with a "big+little" PA configuration. For example, the UE can have one 23 dBm PA ("PA1"), one 20 dBm PA ("PA2"), two 17 dBm PAs ("PA3" and "PA4"), and four 14 dBm PAs ("PA5," "PA6," "PA7," and "PA8"). In the example, Rank 1 PUSCH can be transmitted using PA1, Rank 2 PUSCH can be transmitted using PA1 and PA2, Rank 4 PUSCH can be transmitted using PA1-PA4, and Rank 8 PUSCH can be transmitted using PA1-PA8. However, for Mode 0, equipping 8 PAs to reach full power can result in a high cost of manufacturing and unnecessarily large power consumption by the UE. Additionally, applying a Mode 1 or Mode 2, which allow power scaling factors of ⅛ times the number of activated Tx ports, can result in inefficient use of PA power.

Some aspects of the techniques and apparatuses described herein may facilitate implementation of an 8 Tx UE having a full power mode (e.g., a "Mode OA") in which different PA powers may be applied to different PAs. In some aspects, a total power scaling factor for determining a total transmission power associated with a PUSCH communication may include a summation of a plurality of power scaling factors associated with a set of transmission ports (and/or PAs). In some aspects, for example, with mode OA, a UE may apply the power scaling factor α=Total power of the light up PAs/Total power calculated based on power control equation $$= \min\left(1, \sum_{i=1}^{8} \alpha_i \delta_i\right),$$

where $\alpha_i$ is the power scaling factor of PA of the i-th Tx port, $\delta_i=1$ if i-th Tx port is light up in the PUSCH transmission, $\delta_i=0$ otherwise. For example, for a UE with one 23 dBm PA ("PA1"), one 20 dBm PA ("PA2"), two 17 dBm PAs ("PA3" and "PA4"), and four 14 dBm PAs ("PA5," "PA6," "PA7," and "PA8"), a table such as Table 1, below, may be used for determination of the power scaling factor α.

TABLE 1

| Tx Port Index | Power Scaling Factor |
|---|---|
| Tx Port 1 | $\alpha_1 = 1$ |
| Tx Port 2 | $\alpha_2 = 1/2$ |
| Tx Port 3 | $\alpha_3 = 1/4$ |
| Tx Port 4 | $\alpha_4 = 1/4$ |
| Tx Port 5 | $\alpha_5 = 1/8$ |
| Tx Port 6 | $\alpha_6 = 1/8$ |
| Tx Port 7 | $\alpha_7 = 1/8$ |
| Tx Port 8 | $\alpha_8 = 1/8$ |

For example, for noncoherent 8 Tx, for rank 1 Tx, only 1 transmission port may be activated. Depending on which transmission port is activated, α=the corresponding $\alpha_i$. In some aspects, for noncoherent 8 Tx, for rank K (K>1) Tx, K Tx may be activated, and. α=the summation of $\alpha_i$ of the K corresponding Tx with a cap at 1. For partial coherent 8 Tx, for 1 Tx, Tx 1-4 (in the first panel) may be activated, and α=the summation of $\alpha_i$ of the Tx 1/2/3/4, with a cap at 1.

As indicated above, FIG. 6 is provided as an example. Other examples may differ from what is described with regard to FIG. 6.

Figure 7:
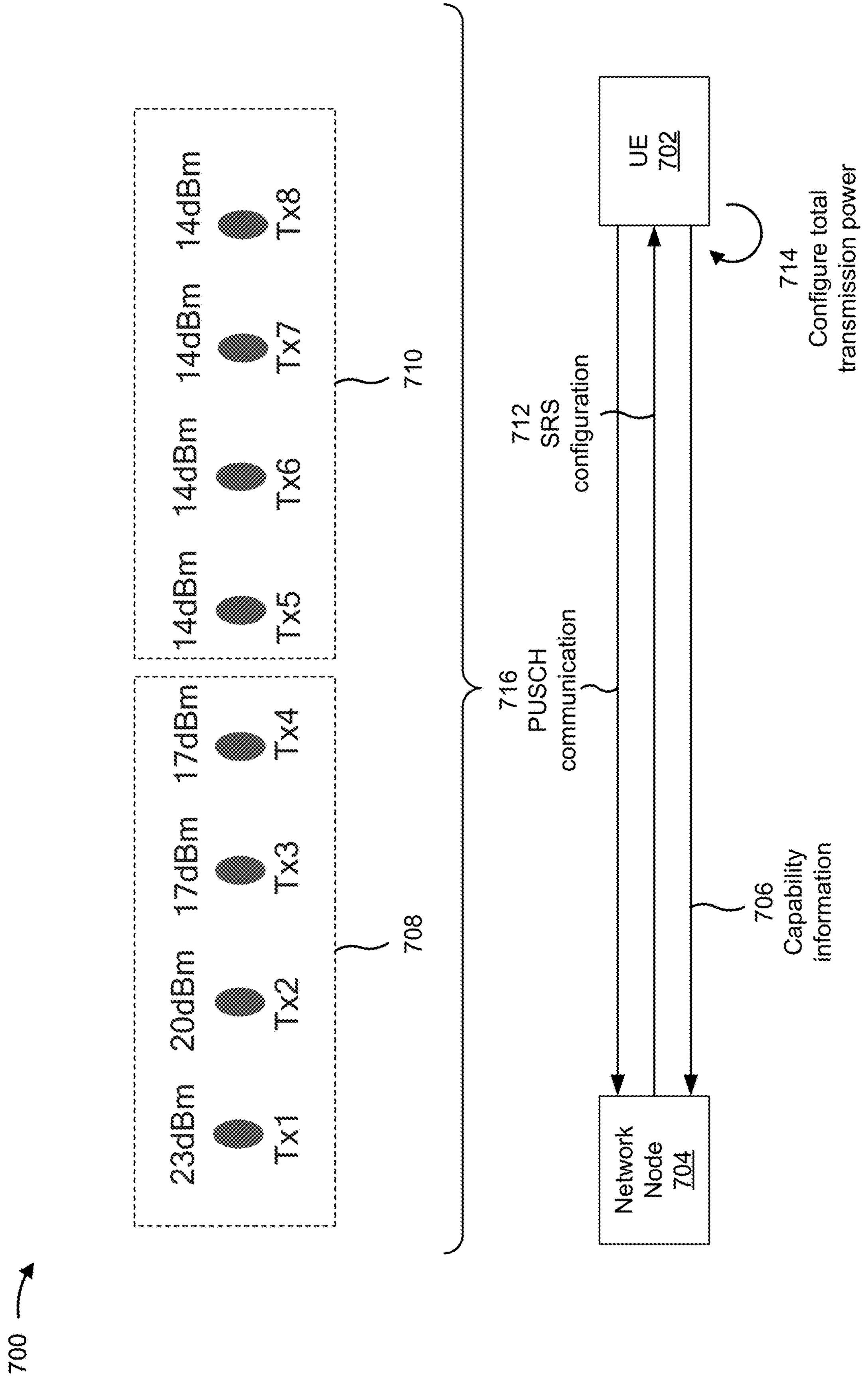
FIG. 7 is a diagram illustrating an example associated with a full power eight-port uplink transmission mode, in accordance with the present disclosure.

FIG. 7 is a diagram illustrating an example 700 associated with a full power eight-port uplink transmission mode, in accordance with the present disclosure. As shown, a UE 702 and a network node 704 may communicate with one another. The UE 702 may be, be similar to, include, or be included in, the UE 120 depicted in FIGS. 1, 2, 5A, 5B, and 6. The network node 704 may be, be similar to, include, or be included in, the network node 110 depicted in FIGS. 1, 2, and 6.

As shown by reference number 706, the UE 702 may transmit, and the network node 704 may receive, capability information. The capability information may be associated with a full power mode corresponding to an eight-port uplink transmission operation associated with eight transmission ports (shown as "Tx1," "Tx2," "Tx3," "Tx4," "Tx5," "Tx6," "Tx7," and "Tx8") of the UE 702. In some aspects, the UE 702 may include eight PAs, at least two of which may correspond to different amplification values.

In some aspects, amplification values associated with respective PAs of the eight PAs may be based on respective power scaling factors of a plurality of power scaling factors. A power scaling factor of the plurality of power scaling factors may include a ratio of a total power associated with the eight PAs to a total power control power. In some aspects, the capability information may not include an indication of any power scaling factor of the plurality of power scaling factors. In some aspects, the capability information may not include an indication of any power scaling factor of the plurality of power scaling factors based on the eight-port uplink transmission operation being a fully coherent transmission operation.

In some aspects, the capability information may indicate at least one power scaling factor of the plurality of power scaling factors. In some aspects, the capability information may indicate each power scaling factor of the plurality of power scaling factors. In some aspects, the capability information may indicate each power scaling factor of the plurality of power scaling factors based on the eight-port uplink transmission operation being a non-coherent transmission operation.

In some aspects, a first subset of the eight transmission ports may include a first antenna group 708 and a second subset of the eight transmission ports may include a second antenna group 710. The capability information may indicate a first aggregated power scaling factor, $$\alpha^1 = \sum_{i=1}^{4} \alpha_i = 1,$$

corresponding to the first antenna group and a second aggregated power scaling factor, $$\alpha^2 = \sum_{i=5}^{8} \alpha_i = 1/2,$$

corresponding to the second antenna group. In some aspects, the first antenna group 708 may include a first plurality of coherent transmission ports and the second antenna group 710 may include a second plurality of coherent transmission ports. In some aspects, a transmission port of the first plurality of coherent transmission ports may be non-coherent with respect to a transmission port of the second plurality of coherent transmission ports.

As shown by reference number 712, the network node 704 may transmit, and the UE 702 may receive, an SRS configuration. The SRS configuration may be based on the configuration information. As shown by reference number 714, the UE 702 may configure, based on a precoder and a total power scaling factor, a total transmission power of a PUSCH communication. The total power scaling factor may include a summation of a plurality of power scaling factors associated with a set of transmission ports of the UE, each transmission port of the set of transmission ports corresponding to a PA of a set of PAs. The UE 702 may obtain, identify, or determine the total transmission power of the PUSCH communication based on the precoder and the total power scaling factor. As shown by reference number 716, the UE 702 may transmit, and the network node 704 may receive, a PUSCH communication. The PUSCH communication may be transmitted based on the total transmission power. For example, the UE 702 may configure the total transmission power based on the precoder and the total power scaling factor, and then the UE may transmit the PUSCH communication in accordance with the total transmission power.

As indicated above, FIG. 7 is provided as an example. Other examples may differ from what is described with regard to FIG. 7.

Figure 8:
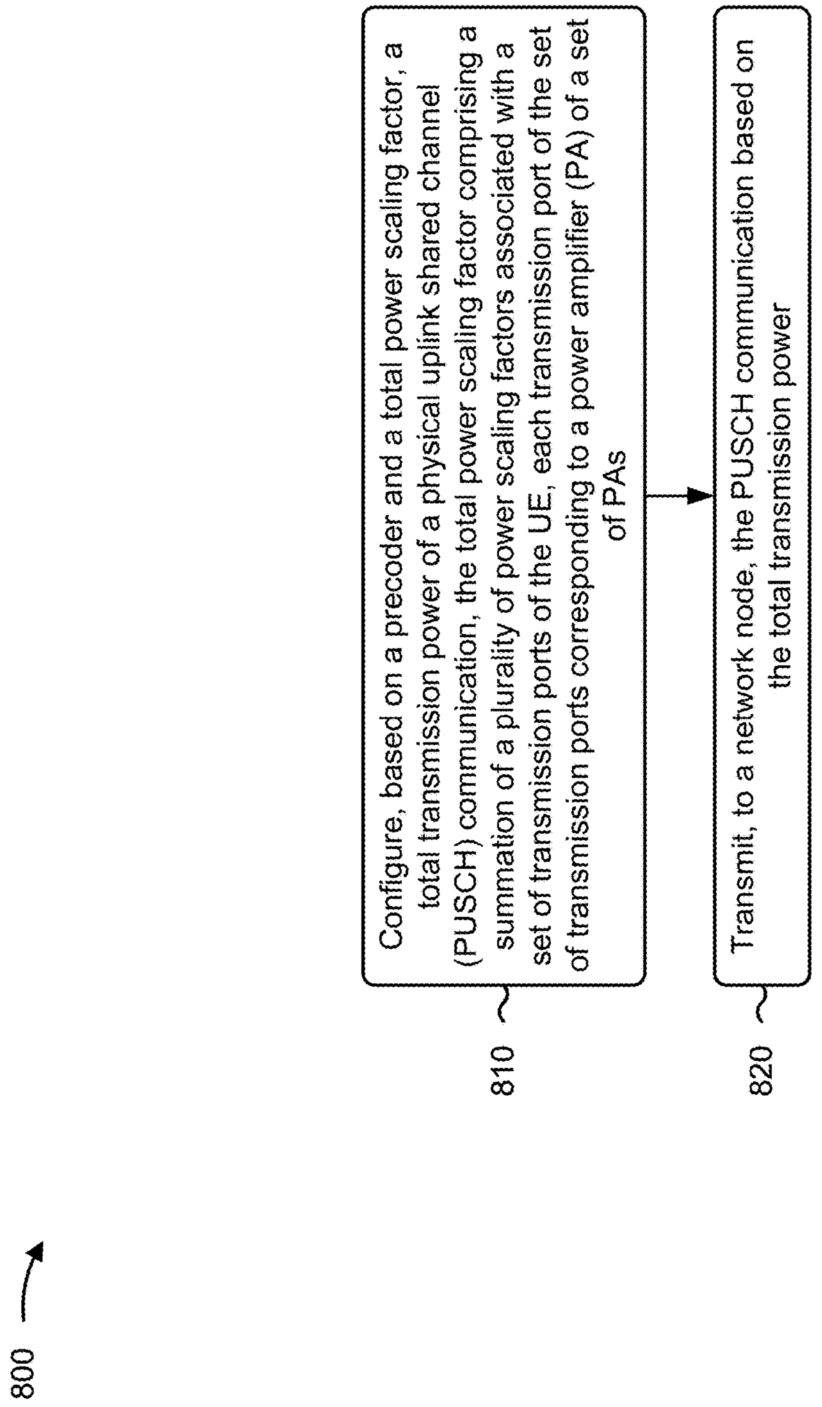
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 702) performs operations associated with full power eight-port uplink transmission mode.

As shown in FIG. 8, in some aspects, process 800 may include configuring, based on a precoder and a total power scaling factor, a total transmission power of a PUSCH communication, the total power scaling factor comprising a summation of a plurality of power scaling factors associated with a set of transmission ports of the UE, each transmission port of the set of transmission ports corresponding to a PA of a set of PAs (block 810). For example, the UE (e.g., using communication manager 1008 and/or transmission component 1004, depicted in FIG. 10) may configure, based on a precoder and a total power scaling factor, a total transmission power of a PUSCH communication, the total power scaling factor comprising a summation of a plurality of power scaling factors associated with a set of transmission ports of the UE, each transmission port of the set of transmission ports corresponding to a PA of a set of PAs, as described above.

As further shown in FIG. 8, in some aspects, process 800 may include transmitting, to a network node, the PUSCH communication based on the total transmission power (block 820). For example, the UE (e.g., using communication manager 1008 and/or transmission component 1004, depicted in FIG. 10) may transmit, to a network node, the PUSCH communication based on the total transmission power, as described above.

Process 800 may include additional aspects, such as any single aspect or any combination of aspects described below and/or in connection with one or more other processes described elsewhere herein.

In a first aspect, a power scaling factor of the plurality of power scaling factors is based on a maximum output power associated with a corresponding PA of the set of PAs. In a second aspect, alone or in combination with the first aspect, the total power scaling factor is capped at a value of 1 based on the summation of the plurality of power scaling factors being greater than 1. In a third aspect, alone or in combination with one or more of the first and second aspects, the set of transmission ports comprises eight transmission ports and the set of PAs comprises eight PAs, and process 800 includes transmitting, to the network node, capability information associated with a full power mode corresponding to an eight-port uplink transmission operation associated with the eight transmission ports, wherein at least two PAs of the set of PAs correspond to different amplification values. In a fourth aspect, alone or in combination with the third aspect, the capability information does not include an indication of any power scaling factor of the plurality of power scaling factors. In a fifth aspect, alone or in combination with the fourth aspect, the capability information does not include an indication of any power scaling factor of the plurality of power scaling factors based on the eight-port uplink transmission operation comprising a fully coherent transmission operation.

In a sixth aspect, alone or in combination with the third aspect, the capability information indicates at least one power scaling factor of the plurality of power scaling factors. In a seventh aspect, alone or in combination with the sixth aspect, the capability information indicates each power scaling factor of the plurality of power scaling factors. In an eighth aspect, alone or in combination with the seventh aspect, the capability information indicates each power scaling factor of the plurality of power scaling factors based on the eight-port uplink transmission operation comprising a non-coherent transmission operation.

In a ninth aspect, alone or in combination with one or more of the sixth through eighth aspects, a first subset of the eight transmission ports comprises a first antenna group and a second subset of the eight transmission ports comprises a second antenna group, and the capability information indicates a first aggregated power scaling factor corresponding to the first antenna group and a second aggregated power scaling factor corresponding to the second antenna group. In a tenth aspect, alone or in combination with the ninth aspect, the first antenna group comprises a first plurality of coherent transmission ports and the second antenna group comprises a second plurality of coherent transmission ports, and a transmission port of the first plurality of coherent transmission ports is non-coherent with respect to a transmission port of the second plurality of coherent transmission ports. In an eleventh aspect, alone or in combination with one or more of the third through tenth aspects, process 800 includes receiving, from the network node, an SRS configuration based on the capability information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
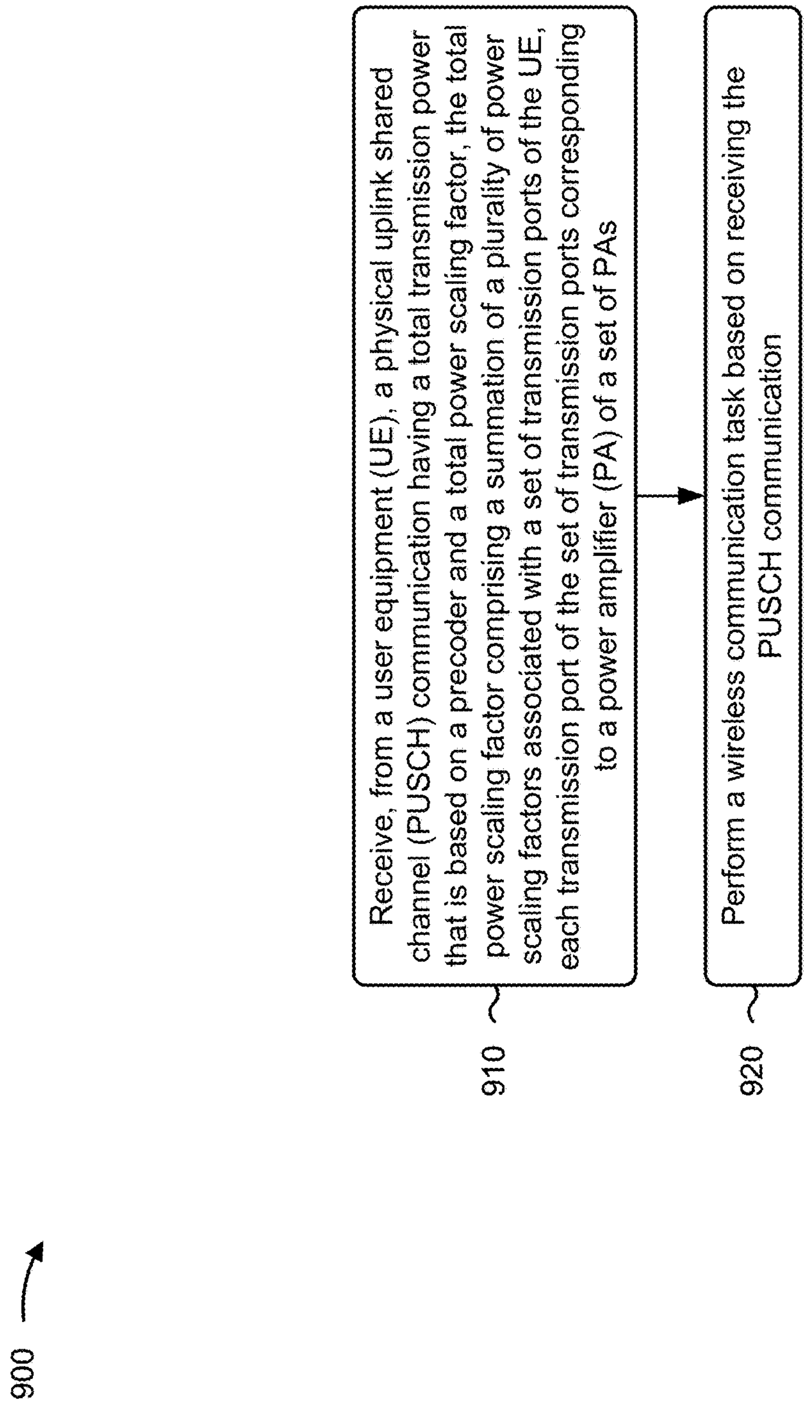
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 704) performs operations associated with full power eight-port uplink transmission mode.

As shown in FIG. 9, in some aspects, process 900 may include receiving, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs (block 910). For example, the network node (e.g., using communication manager 1108 and/or reception component 1102, depicted in FIG. 11) may receive, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs, as described above.

As further shown in FIG. 9, in some aspects, process 900 may include performing a wireless communication task based on receiving the PUSCH communication (block 920). For example, the network node (e.g., using communication manager 1108, reception component 1102, and/or transmission component 1104, depicted in FIG. 11) may perform a wireless communication task based on receiving the PUSCH communication, as described above.

Process 900 may include additional aspects, such as any single aspect or any combination of aspects described below and/or in connection with one or more other processes described elsewhere herein.

In a first aspect, a power scaling factor of the plurality of power scaling factors is based on a maximum output power associated with a corresponding PA of the set of PAs. In a second aspect, alone or in combination with the first aspect, the total power scaling factor is capped at a value of 1 based on the summation of the plurality of power scaling factors being greater than 1. In a third aspect, alone or in combination with one or more of the first and second aspects, the set of transmission ports comprises eight transmission ports and the set of PAs comprises eight PAs, and process 900 includes receiving, from the UE, capability information associated with a full power mode corresponding to an eight-port uplink transmission operation associated with the eight transmission ports, wherein at least two PAs of the set of PAs correspond to different amplification values.

In a fourth aspect, alone or in combination with the third aspect, the capability information does not include an indication of any power scaling factor of the plurality of power scaling factors. In a fifth aspect, alone or in combination with the fourth aspect, the capability information does not include an indication of any power scaling factor of the plurality of power scaling factors based on the eight-port uplink transmission operation comprising a fully coherent transmission operation.

In a sixth aspect, alone or in combination with the third aspect, the capability information indicates at least one power scaling factor of the plurality of power scaling factors. In a seventh aspect, alone or in combination with the sixth aspect, the capability information indicates each power scaling factor of the plurality of power scaling factors. In an eighth aspect, alone or in combination with the seventh aspect, the capability information indicates each power scaling factor of the plurality of power scaling factors based on the eight-port uplink transmission operation comprising a non-coherent transmission operation.

In a ninth aspect, alone or in combination with one or more of the sixth through eighth aspects, a first subset of the eight transmission ports comprises a first antenna group and a second subset of the eight transmission ports comprises a second antenna group, and the capability information indicates a first aggregated power scaling factor corresponding to the first antenna group and a second aggregated power scaling factor corresponding to the second antenna group. In a tenth aspect, alone or in combination with the ninth aspect, the first antenna group comprises a first plurality of coherent transmission ports and the second antenna group comprises a second plurality of coherent transmission ports, and a transmission port of the first plurality of coherent transmission ports is non-coherent with respect to a transmission port of the second plurality of coherent transmission ports.

In an eleventh aspect, alone or in combination with one or more of the third through tenth aspects, process 900 includes transmitting, to the UE, an SRS configuration based on the capability information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
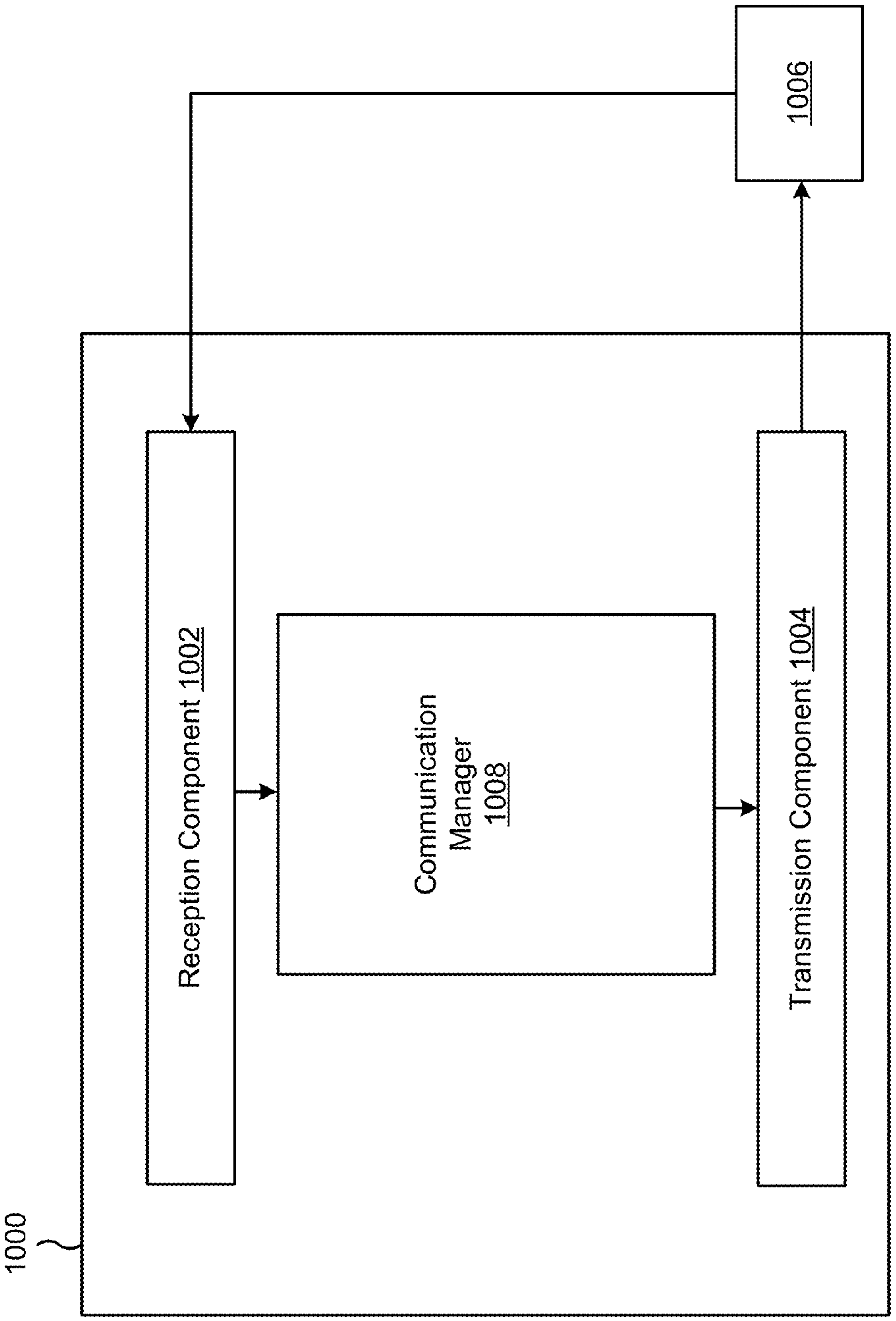
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some examples, means for configuring, transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

The communication manager 1008 and/or the transmission component 1004 may configure, based on a precoder and a total power scaling factor, a total transmission power of a PUSCH communication, the total power scaling factor comprising a summation of a plurality of power scaling factors associated with a set of transmission ports of the UE, each transmission port of the set of transmission ports corresponding to a PA of a set of PAs. In some aspects, the communication manager 1008 may include one or more antennas, a modem, a controller/processor, a memory, or a combination thereof, of the UE described in connection with FIG. 2. In some aspects, the communication manager 1008 may include the reception component 1002 and/or the transmission component 1004. In some aspects, the communication manager 1008 may be, be similar to, include, or be included in, the communication manager 140 depicted in FIGS. 1 and 2. In some aspects, the communication manager 1008 and/or the transmission component 1004 may transmit, to a network node, the PUSCH communication based on the total transmission power.

The communication manager 1008 and/or the transmission component 1004 may transmit, to a network node, capability information associated with a full power mode corresponding to an eight-port uplink transmission operation associated with eight transmission ports of the UE, the UE comprising eight PAs, at least two of which correspond to different amplification values. The communication manager 1008 and/or the reception component 1002 may receive, from the network node, an SRS configuration based on the capability information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
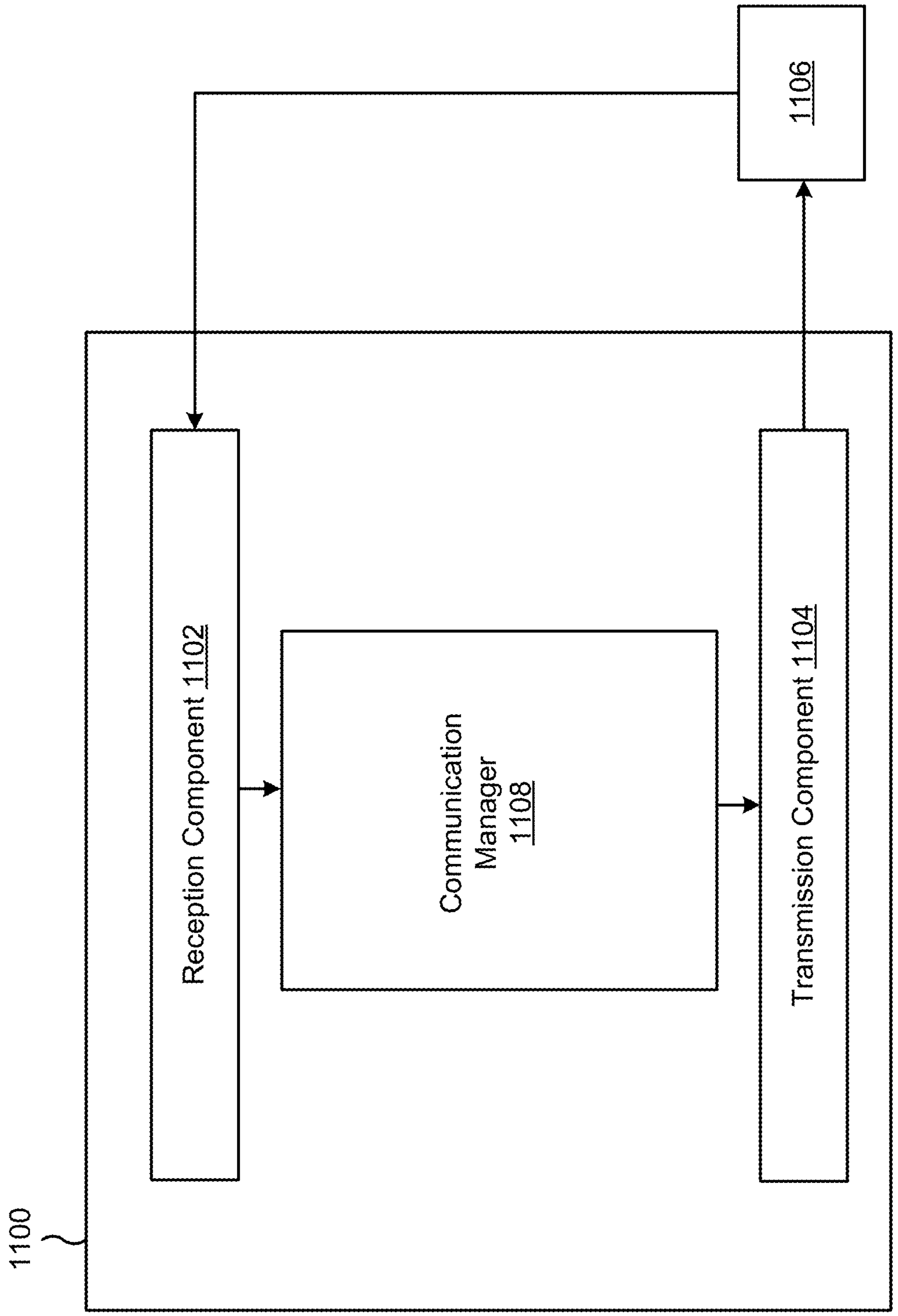
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

The communication manager 1108 and/or the reception component 1102 may receive, from a UE, a PUSCH communication having a total transmission power that is based on a precoder and a total power scaling factor, the total power scaling factor comprising a summation of a plurality of power scaling factors associated with a set of transmission ports of the UE, each transmission port of the set of transmission ports corresponding to a PA of a set of PAs. In some aspects, the communication manager 1108 may include one or more antennas, a modem, a controller/processor, a memory, or a combination thereof, of the network node described in connection with FIG. 2. In some aspects, the communication manager 1108 may include the reception component 1102 and/or the transmission component 1104. In some aspects, the communication manager 1108 may be, be similar to, include, or be included in, the communication manager 150 depicted in FIGS. 1 and 2. The communication manager 1108, the reception component 1102, and/or the transmission component 1104 may perform a wireless communication task based on receiving the PUSCH communication.

The communication manager 1108 and/or the reception component 1102 may receive, from a UE, capability information associated with a full power mode corresponding to an eight-port uplink transmission operation associated with eight antenna ports of the UE, the UE comprising eight PAs, at least two of which correspond to different amplification values. The communication manager 1108 and/or the transmission component 1104 may transmit, to the UE, an SRS configuration based on the capability information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by an apparatus at a user equipment (UE), comprising: configuring, based on a precoder and a total power scaling factor, a total transmission power of a physical uplink shared channel (PUSCH) communication, the total power scaling factor comprising a summation of a plurality of power scaling factors associated with a set of transmission ports of the UE, each transmission port of the set of transmission ports corresponding to a power amplifier (PA) of a set of PAs; and transmitting, to a network node, the PUSCH communication based on the total transmission power.

Aspect 2: The method of Aspect 1, wherein a power scaling factor of the plurality of power scaling factors is based on a maximum output power associated with a corresponding PA of the set of PAs Aspect 3: The method of either of Aspects 1 or 2, wherein the total power scaling factor is capped at a value of 1 based on the summation of the plurality of power scaling factors being greater than 1.

Aspect 4: The method of any of Aspects 1-3, wherein the set of transmission ports comprises eight transmission ports and the set of PAs comprises eight PAs, the method further comprising transmitting, to the network node, capability information associated with a full power mode corresponding to an eight-port uplink transmission operation associated with the eight transmission ports, wherein at least two PAs of the set of PAs correspond to different amplification values.

Aspect 5: The method of Aspect 4, wherein the capability information does not include an indication of any power scaling factor of the plurality of power scaling factors.

Aspect 6: The method of Aspect 5, wherein the capability information does not include an indication of any power scaling factor of the plurality of power scaling factors based on the eight-port uplink transmission operation comprising a fully coherent transmission operation.

Aspect 7: The method of Aspect 4, wherein the capability information indicates at least one power scaling factor of the plurality of power scaling factors.

Aspect 8: The method of Aspect 7, wherein the capability information indicates each power scaling factor of the plurality of power scaling factors.

Aspect 9: The method of Aspect 8, wherein the capability information indicates each power scaling factor of the plurality of power scaling factors based on the eight-port uplink transmission operation comprising a non-coherent transmission operation.

Aspect 10: The method of any of Aspects 7-9, wherein a first subset of the eight transmission ports comprises a first antenna group and a second subset of the eight transmission ports comprises a second antenna group, and wherein the capability information indicates a first aggregated power scaling factor corresponding to the first antenna group and a second aggregated power scaling factor corresponding to the second antenna group.

Aspect 11: The method of Aspect 10, wherein the first antenna group comprises a first plurality of coherent transmission ports and the second antenna group comprises a second plurality of coherent transmission ports, and wherein a transmission port of the first plurality of coherent transmission ports is non-coherent with respect to a transmission port of the second plurality of coherent transmission ports.

Aspect 12: The method of any of Aspects 4-11, further comprising receiving, from the network node, a sounding reference signal (SRS) configuration based on the capability information.

Aspect 13: A method of wireless communication performed by an apparatus at a network node, comprising: receiving, from a user equipment (UE), a physical uplink shared channel (PUSCH) communication having a total transmission power that is based on a precoder and a total power scaling factor, the total power scaling factor comprising a summation of a plurality of power scaling factors associated with a set of transmission ports of the UE, each transmission port of the set of transmission ports corresponding to a power amplifier (PA) of a set of PAs; and performing a wireless communication task based on receiving the PUSCH communication.

Aspect 14: The method of Aspect 13, wherein a power scaling factor of the plurality of power scaling factors is based on a maximum output power associated with a corresponding PA of the set of PAs.

Aspect 15: The method of either of Aspects 13 or 14, wherein the total power scaling factor is capped at a value of 1 based on the summation of the plurality of power scaling factors being greater than 1.

Aspect 16: The method of any of Aspects 13-15, wherein the set of transmission ports comprises eight transmission ports and the set of PAs comprises eight PAs, the method further comprising receiving, from the UE, capability information associated with a full power mode corresponding to an eight-port uplink transmission operation associated with the eight transmission ports, wherein at least two PAs of the set of PAs correspond to different amplification values.

Aspect 17: The method of Aspect 16, wherein the capability information does not include an indication of any power scaling factor of the plurality of power scaling factors.

Aspect 18: The method of Aspect 17, wherein the capability information does not include an indication of any power scaling factor of the plurality of power scaling factors based on the eight-port uplink transmission operation comprising a fully coherent transmission operation.

Aspect 19: The method of Aspect 16, wherein the capability information indicates at least one power scaling factor of the plurality of power scaling factors.

Aspect 20: The method of Aspect 19, wherein the capability information indicates each power scaling factor of the plurality of power scaling factors.

Aspect 21: The method of Aspect 20, wherein the capability information indicates each power scaling factor of the plurality of power scaling factors based on the eight-port uplink transmission operation comprising a non-coherent transmission operation.

Aspect 22: The method of any of Aspects 19-21, wherein a first subset of the eight transmission ports comprises a first antenna group and a second subset of the eight transmission ports comprises a second antenna group, and wherein the capability information indicates a first aggregated power scaling factor corresponding to the first antenna group and a second aggregated power scaling factor corresponding to the second antenna group.

Aspect 23: The method of Aspect 22, wherein the first antenna group comprises a first plurality of coherent transmission ports and the second antenna group comprises a second plurality of coherent transmission ports, and wherein a transmission port of the first plurality of coherent transmission ports is non-coherent with respect to a transmission port of the second plurality of coherent transmission ports.

Aspect 24: The method of any of Aspects 16-23, further comprising transmitting, to the UE, a sounding reference signal (SRS) configuration based on the capability information.

Aspect 25: An apparatus for wireless communication at a device, comprising one or more processors; one or more memories coupled with the one or more processors; and instructions stored in the one or more memories and executable by the one or more processors, individually or collectively, to cause the apparatus to perform the method of one or more of Aspects 1-12.

Aspect 26: A device for wireless communication, comprising one or more memories and one or more processors coupled to the one or more memories, the one or more processors individually or collectively configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising one or more processors; one or more memories coupled with the one or more processors; and instructions stored in the one or more memories and executable by the one or more processors, individually or collectively, to cause the apparatus to perform the method of one or more of Aspects 13-24.

Aspect 31: A device for wireless communication, comprising one or more memories and one or more processors coupled to the one or more processors, the one or more processors individually or collectively configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more antennas; and a processing system that includes one or more processors and one or more memories that store code and are coupled with the one or more processors, the processing system configured to cause the UE to:

configure, based on a precoder and a total power scaling factor, a total transmission power of a physical uplink shared channel (PUSCH) communication, the total power scaling factor comprising a summation of a plurality of power scaling factors associated with a set of transmission ports of the UE, each transmission port of the set of transmission ports corresponding to a power amplifier (PA) of a set of PAs;

transmit, to a network node, capability information associated with a full power mode corresponding to a transmission operation associated with the set of transmission ports, wherein the capability information includes the total power scaling factor of the UE, and wherein the capability information includes precoders that support a maximum transmission power for the UE; and transmit, to the network node, the PUSCH communication based on the total transmission power.

2. The UE of claim 1, wherein a power scaling factor of the plurality of power scaling factors is based on a maximum output power associated with a corresponding PA of the set of PAs.

3. The UE of claim 1, wherein the total power scaling factor is capped at a value of 1 based on the summation of the plurality of power scaling factors being greater than 1.

4. The UE of claim 1, wherein the set of transmission ports comprises eight transmission ports and the set of PAs comprises eight PAs, wherein the full power mode corresponds to an eight-port uplink transmission operation associated with the eight transmission ports, and wherein at least two PAs of the set of PAs correspond to different amplification values.

5. The UE of claim 4, wherein the capability information does not include an indication of any power scaling factor of the plurality of power scaling factors.

6. The UE of claim 5, wherein the capability information does not include an indication of any power scaling factor of the plurality of power scaling factors based on the eight-port uplink transmission operation comprising a fully coherent transmission operation.

7. The UE of claim 4, wherein the capability information indicates at least one power scaling factor of the plurality of power scaling factors.

8. The UE of claim 7, wherein the capability information indicates each power scaling factor of the plurality of power scaling factors.

9. The UE of claim 8, wherein the capability information indicates each power scaling factor of the plurality of power scaling factors based on the eight-port uplink transmission operation comprising a non-coherent transmission operation.

10. The UE of claim 7, wherein a first subset of the eight transmission ports comprises a first antenna group and a second subset of the eight transmission ports comprises a second antenna group, and wherein the capability information indicates a first aggregated power scaling factor corresponding to the first antenna group and a second aggregated power scaling factor corresponding to the second antenna group.

11. The UE of claim 10, wherein the first antenna group comprises a first plurality of coherent transmission ports and the second antenna group comprises a second plurality of coherent transmission ports, and wherein a transmission port of the first plurality of coherent transmission ports is non-coherent with respect to a transmission port of the second plurality of coherent transmission ports.

12. The UE of claim 4, wherein the processing system is further configured to cause the UE to:

receive, from the network node, a sounding reference signal (SRS) configuration based on the capability information.

13. A network node for wireless communication, comprising:

one or more antennas; and a processing system that includes one or more processors and one or more memories that store code and are coupled with the one or more processors, the processing system configured to cause the network node to:

receive, from a user equipment (UE), a physical uplink shared channel (PUSCH) communication having a total transmission power that is based on a precoder and a total power scaling factor, the total power scaling factor comprising a summation of a plurality of power scaling factors associated with a set of transmission ports of the UE, each transmission port of the set of transmission ports corresponding to a power amplifier (PA) of a set of PAs;

receive, from the UE, capability information associated with a full power mode corresponding to a transmission operation associated with the set of transmission ports, wherein the capability information includes the total power scaling factor of the UE, and wherein the capability information includes precoders that support a maximum transmission power for the UE; and perform a wireless communication task based on receiving the PUSCH communication.

14. The network node of claim 13, wherein a power scaling factor of the plurality of power scaling factors is based on a maximum output power associated with a corresponding PA of the set of PAs.

15. The network node of claim 13, wherein the total power scaling factor is capped at a value of 1 based on the summation of the plurality of power scaling factors being greater than 1.

16. The network node of claim 13, wherein the set of transmission ports comprises eight transmission ports and the set of PAs comprises eight PAs, wherein the full power mode corresponds to an eight-port uplink transmission operation associated with the eight transmission ports, and wherein at least two PAs of the set of PAs correspond to different amplification values.

17. The network node of claim 16, wherein the capability information does not include an indication of any power scaling factor of the plurality of power scaling factors.

18. The network node of claim 17, wherein the capability information does not include an indication of any power scaling factor of the plurality of power scaling factors based on the eight-port uplink transmission operation comprising a fully coherent transmission operation.

19. The network node of claim 16, wherein the capability information indicates at least one power scaling factor of the plurality of power scaling factors.

20. The network node of claim 19, wherein the capability information indicates each power scaling factor of the plurality of power scaling factors.

21. The network node of claim 20, wherein the capability information indicates each power scaling factor of the plurality of power scaling factors based on the eight-port uplink transmission operation comprising a non-coherent transmission operation.

22. The network node of claim 19, wherein a first subset of the eight transmission ports comprises a first antenna group and a second subset of the eight transmission ports comprises a second antenna group, and wherein the capability information indicates a first aggregated power scaling factor corresponding to the first antenna group and a second aggregated power scaling factor corresponding to the second antenna group.

23. The network node of claim 22, wherein the first antenna group comprises a first plurality of coherent transmission ports and the second antenna group comprises a second plurality of coherent transmission ports, and wherein a transmission port of the first plurality of coherent transmission ports is non-coherent with respect to a transmission port of the second plurality of coherent transmission ports.

24. The network node of claim 16, wherein the processing system is further configured to cause the network node to:

transmit, to the UE, a sounding reference signal (SRS) configuration based on the capability information.

25. A method of wireless communication performed by an apparatus at a user equipment (UE), comprising:

configuring, based on a precoder and a total power scaling factor, a total transmission power of a physical uplink shared channel (PUSCH) communication, the total power scaling factor comprising a summation of a plurality of power scaling factors associated with a set of transmission ports of the UE, each transmission port of the set of transmission ports corresponding to a power amplifier (PA) of a set of PAs;

transmitting, to a network node, capability information associated with a full power mode corresponding to a transmission operation associated with the set of transmission ports, wherein the capability information includes the total power scaling factor of the UE, and wherein the capability information includes precoders that support a maximum transmission power for the UE; and transmitting, to the network node, the PUSCH communication based on the total transmission power.

26. The method of claim 25, wherein a power scaling factor of the plurality of power scaling factors is based on a maximum output power associated with a corresponding PA of the set of PAs.

27. The method of claim 25, wherein the set of transmission ports comprises eight transmission ports and the set of PAs comprises eight PAs, wherein the full power mode corresponds to an eight-port uplink transmission operation associated with the eight transmission ports, and wherein at least two PAs of the set of PAs correspond to different amplification values.

28. A method of wireless communication performed by an apparatus at a network node, comprising:

receiving, from a user equipment (UE), a physical uplink shared channel (PUSCH) communication having a total transmission power that is based on a precoder and a total power scaling factor, the total power scaling factor comprising a summation of a plurality of power scaling factors associated with a set of transmission ports of the UE, each transmission port of the set of transmission ports corresponding to a power amplifier (PA) of a set of PAs;

receiving, from the UE, capability information associated with a full power mode corresponding to a transmission operation associated with the set of transmission ports, wherein the capability information includes the total power scaling factor of the UE, and wherein the capability information includes precoders that support a maximum transmission power for the UE; and performing a wireless communication task based on receiving the PUSCH communication.

29. The method of claim 28, wherein a power scaling factor of the plurality of power scaling factors is based on a maximum output power associated with a corresponding PA of the set of PAs.

30. The method of claim 28, wherein the set of transmission ports comprises eight transmission ports and the set of PAs comprises eight PAs, wherein the full power mode corresponds to an eight-port uplink transmission operation associated with the eight transmission ports, and wherein at least two PAs of the set of PAs correspond to different amplification values.

* * * * *